United States Patent
Tsuruya

(10) Patent No.: US 7,183,753 B2
(45) Date of Patent: Feb. 27, 2007

(54) POWER FACTOR CORRECTION CIRCUIT

(75) Inventor: Mamoru Tsuruya, Niiza (JP)

(73) Assignee: Sanken Electric Co., Ltd. (JP)

( * ) Notice: Subject to any disclaimer, the term of this patent is extended or adjusted under 35 U.S.C. 154(b) by 56 days.

(21) Appl. No.: 10/521,477

(22) PCT Filed: Mar. 30, 2004

(86) PCT No.: PCT/JP2004/004515

§ 371 (c)(1),
(2), (4) Date: Jan. 19, 2005

(87) PCT Pub. No.: WO2004/095682

PCT Pub. Date: Nov. 4, 2004

(65) Prior Publication Data

US 2005/0226015 A1 Oct. 13, 2005

(30) Foreign Application Priority Data

Apr. 22, 2003 (JP) ............................. 2003-117403

(51) Int. Cl.
*G05F 1/656* (2006.01)
(52) U.S. Cl. .................... 323/222; 363/95; 363/89
(58) Field of Classification Search .................. 363/49, 363/72, 89, 48, 53, 124, 34, 37, 123; 323/222, 323/282, 283–286, 268, 272
See application file for complete search history.

(56) References Cited

U.S. PATENT DOCUMENTS 4,977,493 A * 12/1990 Smith .......................... 363/126
5,001,620 A * 3/1991 Smith .......................... 363/89
5,654,626 A * 8/1997 Karlsson .................... 323/222

FOREIGN PATENT DOCUMENTS

| EP | 0 351 144 A | 1/1990 |
| JP | 2000-37072 | 2/2000 |
| WO | WO 00/03473 A | 1/2000 |

* cited by examiner

*Primary Examiner*—Rajnikant B. Patel
(74) *Attorney, Agent, or Firm*—Kilpatrick Stockton LLP

(57) ABSTRACT

A power factor correction circuit includes; a series circuit connected to a positive-electrode output terminal P1 and negative-electrode output terminal P2 of a full-wave rectifying circuit B1, which rectifies an having current power-supply voltage of an alternating current power-supply Vac1, and including a booster winding 5a and a wind-up winding 5b wound on a booster reactor L1, a diode D1 and a smoothing capacitor C1; a series circuit, connected between the positive-electrode output terminal P1 and the negative-electrode output terminal P2 and having the booster winding 5a, a ZCS reactor L2 and a switch Q1; a diode D2 connected between a junction, between the switch Q1 and the ZCS reactor L2, and the smoothing capacitor C1; and a control circuit 10 that controllably turns the switch Q1 on and off for controlling an output voltage of the smoothing capacitor C1 to a given voltage.

7 Claims, 27 Drawing Sheets

POWER FACTOR CORRECTION CIRCUIT

TECHNICAL FIELD

The present invention relates to a power factor correction circuit for use in a switching power-supply with high efficiency, low noises and high power factor.

BACKGROUND ART

FIG. 1 is a circuit structural view of a power factor correction circuit disclosed in Japanese Patent Application No. 2000-37072. In the power factor correction circuit shown in FIG. 1, connected to both output terminals of a full-wave rectifying circuit B1, which rectifies an alternating current power-supply voltage of an alternating current power-supply Vac1, is a series circuit that is comprised of a booster reactor L1, a switch Q1 composed of a MOSFET, and a current detection resistor R. Connected across both terminals of the switch Q1 is a series circuit that is comprised of a diode D1 and a smoothing capacitor C1, and connected across the smoothing capacitor C1 is a load RL. The switch Q1 is PWM controlled by a control circuit 100 to be turned on and off.

The current detection resistor R detects an input current flowing through the full-wave rectifying circuit B1.

The control circuit 100 is comprised of an error amplifier 111, a multiplier 112, an error amplifier 113, an oscillator (OSC) 114 and a PWM comparator 116.

The error amplifier 111 has a "+" terminal applied with a reference voltage E1 and a "−" terminal applied with a voltage developed across the smoothing capacitor C1, upon which an error between a voltage of the smoothing capacitor C1 and the reference voltage E1 is amplified to generate an error voltage signal that is outputted to the multiplier 112. The multiplier 112 multiplies the error voltage signal delivered from the error amplifier 111 and a full-wave rectified voltage delivered from a positive-electrode terminal P1 of the full-wave rectifying circuit B1.

The error amplifier 113 has a "−" terminal applied with a voltage proportional to the input current detected by the current detection resistor R and a "+" terminal applied with the multiplied output voltage delivered from the multiplier 112, upon which an error between a voltage developed across the current detection resistor R and the multiplied output voltage is amplified to generate an error voltage signal that is outputted as a feedback signal FB to the PWM comparator 116.

The PWM comparator 116 has a "−" terminal applied with a ramp signal from the OSC 114 and a "+" terminal applied with the feedback signal FB from the error amplifier, generating a pulse signal for causing the switch Q1 to be turned on when a value of the feedback signal FB exceeds a value of the ramp signal and turned off when the value of the feedback signal FB is less than the value of the ramp signal. This pulse signal is applied to a gate of the switch Q1.

That is, the PWM comparator 116 outputs a duty pulse, depending on an error signal delivered from the error amplifier 113 between an output of the current detection resistor R and an output of the multiplier 112, to the switch Q1. The duty pulse is a pulse width control signal that continuously compensates a power factor in terms of variations in the alternating current power-supply voltage and a direct current load voltage for fixed cycles. With such a structure, an alternating current power-supply current waveform is so controlled as to align with an alternating current power-supply voltage waveform, remarkably improving the power factor.

Now, operation of the power factor correction circuit with such a structure is described with reference to a timing chart shown in FIG. 2. Also, FIG. 2 shows waveforms of a voltage Q1$v$ developed across the switch Q1, a current Q1$i$ flowing through the switch Q1, and a current D1$i$ flowing through the diode D1.

First, as the switch Q1 is turned on at time t31, a current Q1$i$ flows from the full-wave rectifying circuit B1 to the switch q1 via the booster reactor L1. This current linearly and progressively increases with time being elapsed to time t32. Also, during a time period between time t31 and time t32, the current D1$i$ flowing through the diode D1 is at zero.

Next, at time t32, the switch Q1 shifts from the turned-on state to a turned-off state. In this moment, the voltage Q1$v$ of the switch Q1 raises due to exciting energy induced in the booster reactor L1. Moreover, during a time period between time t32 and time t33, since the switch Q1 remains in the turned-off state, the current Q1$i$ flowing through the switch Q1 remains zero. Also, during a time period between time t32 and time t33, the current D1$i$ flows in a path expressed as L1→D1→C1 and electric power is supplied to the load RL.

DISCLOSURE OF INVENTION

However, with the power factor correction circuit shown in FIG. 1, during the turned-on or turned-off states of the switch Q1, overlapped portions occur between the voltage Q1$v$ and the current Q1$i$ of the switch Q1, resulting in an issue with the occurrence of increased switching losses.

Further, when the switch Q1 is turned on (for instance, at times t31, t33 and t35), a spike current RC flows in a path expressed as C1→D1→Q1 due to the occurrence of diode recovery. Also, when the switch Q1 is turned off (for instance, at times t32, t34 and t36), a spike voltage SP occurs due to inductance caused by the wirings.

During recovery time, the diode D1 remains in a short-circuited state, increasing losses of the switch Q1. Moreover, due to the additional provision of a CR absorber comprised of a resistor and a capacitor for the purpose of suppressing the spike voltage resulting when the switch Q1 is turned off, also causing the CR absorber to have increased losses.

Further, the spike voltage and the spike current cause noises to occur. A noise filter for reducing such noises is largely sized in structure, causing hindrance to the achievement of miniaturization and high efficiency of the switching power-supply.

The present invention has an object to provide a power factor correction circuit that enables a switch to execute zero-current switching and zero-voltage switching for thereby making it possible to achieve miniaturization, high efficiency and low noises.

The present invention has been completed with a view to addressing the above issues and, according to one aspect of the present invention, there is provided a power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off for correcting an input power factor while converting the power-supply voltage into a direct current output voltage, and which comprises a first series circuit connected between one output terminal and the other output terminal of the rectifying circuit and including a booster winding and a wind-up winding, both wound on the booster reactor, a first diode and a smoothing capacitor, a second series circuit connected between the one output terminal and the other output terminal of the rectifying circuit and including the booster winding of the booster reactor, a zero-current switching reactor and the main switch, a second diode connected between a junction, between the main switch and the zero-current switching reactor, and the smoothing capacitor, and control means for controllably turning on and off the main switch to control an output voltage of the smoothing capacitor to a given voltage.

Another aspect of the present invention provides a power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off for correcting an input power factor while converting the power-supply voltage into a direct current output voltage, and which comprises a first series circuit connected between one output terminal and the other output terminal of the rectifying circuit and including a booster winding and a wind-up winding, both wound on the booster reactor, a zero-current switching reactor, a first diode and a smoothing capacitor, a second series circuit connected between one output terminal and the other output terminal of the rectifying circuit and including the booster winding of the booster reactor, and the main switch, a second diode connected between a junction, between the booster winding and the wind-up winding of the booster reactor, and the main switch and the smoothing capacitor, and control means for controllably turning on and off the main switch to control an output voltage of the smoothing capacitor to a given voltage.

BEST MODE FOR CARRYING OUT THE INVENTION

Hereinafter, power factor correction circuits of various embodiments according to the present invention are described below in detail with reference to the accompanying drawings.

(First Embodiment)

A power factor correction circuit of a first embodiment includes a zero-current switching reactor connected to a main switch in series to allow the main switch to achieve ZCS (zero-current switching) during a turned-on state for thereby reducing losses resulting from a recovery cycle of a rectifying diode such that current gradually changes for thereby performing switching operations at high efficiency and low noises.

Figure 3:
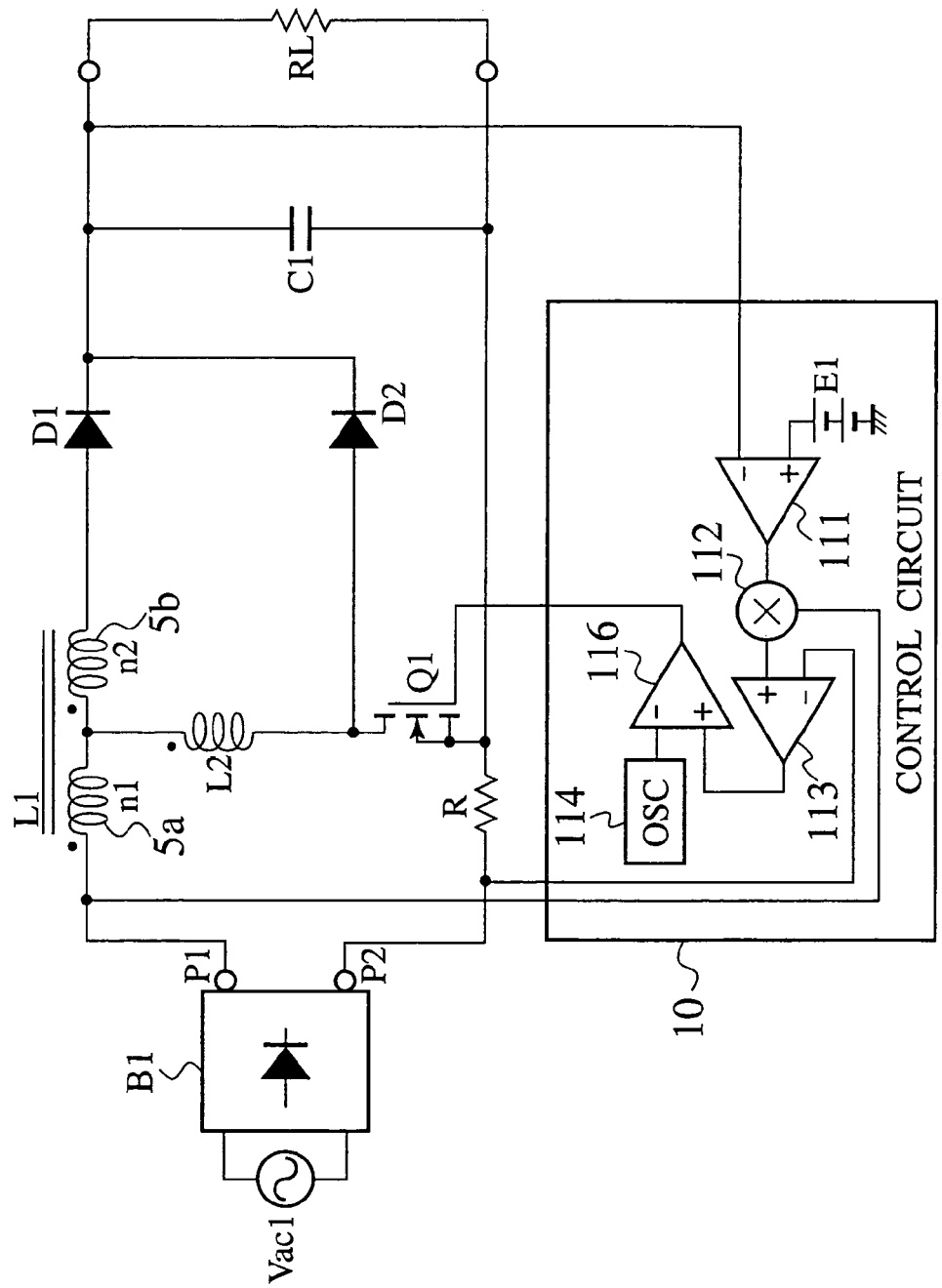
FIG. 3 is a circuit structural view illustrating a power factor correction circuit of a first embodiment according to the present invention.

FIG. 3 is a circuit structural view of the power factor correction circuit of the first embodiment. In FIG. 3, a full wave rectifier circuit B1 is connected to an Alternating current power-supply Vac1 to rectify an Alternating current power-supply voltage, received from the Alternating current power-supply Vac1, into a DC voltage that is applied to a positive electrode output terminal P1 and a negative electrode output terminal P2.

Connected between the positive electrode output terminal P1 and the negative electrode output terminal P2 of the full wave rectifier circuit B1 is a first series circuit that includes a booster winding 5a (with the number of turns of n1) and a wind-up winding 5b (with the number of turns of n2) wound on a booster reactor L1, a diode D1, a smoothing capacitor C1 and a current detection resistor R (that corresponds to a current detection means of the present invention).

Further connected between the positive electrode output terminal P1 and the negative electrode output terminal P2 of the full wave reactor circuit B1 is a second series circuit that includes the booster winding 5a of the booster reactor L1, a ZCS reactor L2, a switch Q (main switch) composed of MOSFET, and the current detection resistor R. A diode D2 is connected to a junction, between the switch Q1 and the ZCS reactor L2, and the smoothing capacitor C1.

The switch Q1 is PWM controlled by a control circuit 10 to turns on or turns off. The diode D1 and the smoothing capacitor C1 form a rectifier smoothing circuit. Connected to the smoothing capacitor C1 in parallel is a load RL and a rectified voltage resulting from the diode D1 is smoothed by the smoothing capacitor C1 into a DC output that is applied to the load RL.

Figure 1:
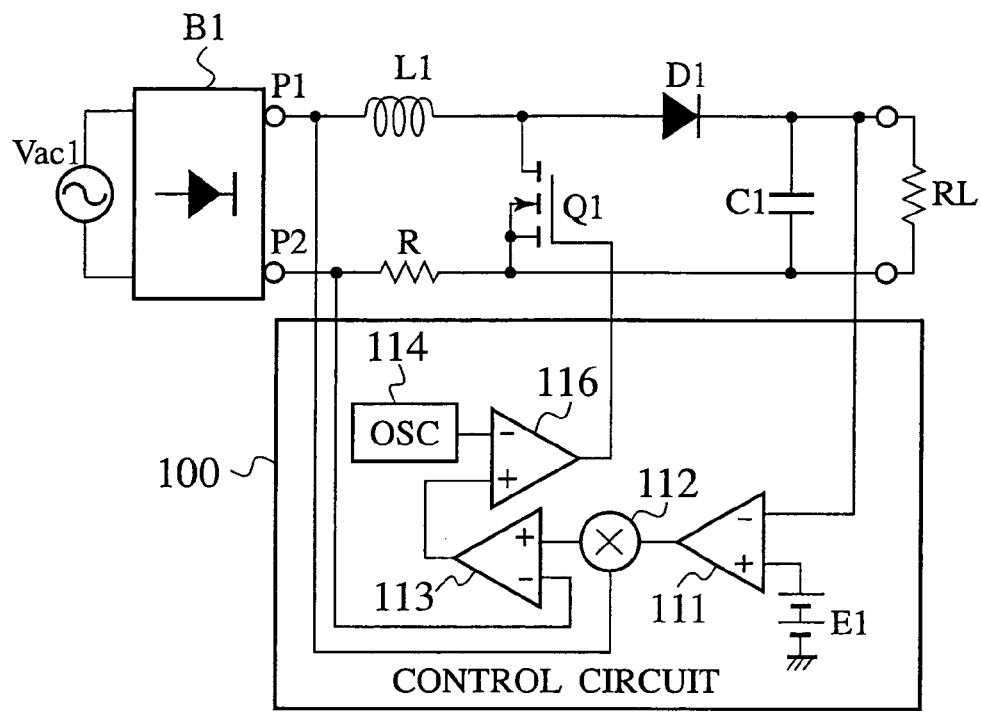
FIG. 1 is a circuit structural view illustrating a power factor correction circuit of the related art.
Figure 2:
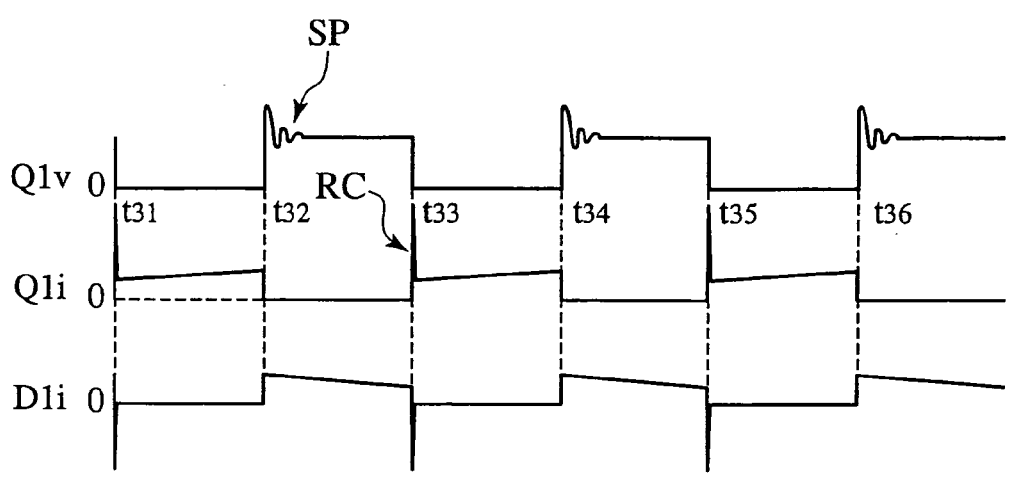
FIG. 2 is a timing chart for signals in various parts of the related art power factor correction circuit.

The current detection resistor R detects an input current flowing across the full wave rectifier circuit B1. The control circuit 10, which is comprised of an error amplifier 111, a multiplier 112, an error amplifier 113, an OSC 114 and a PWM comparator 116, has the same structure as the control circuit 100 shown in FIG. 1 and description of the same is herein omitted.

Figure 4:
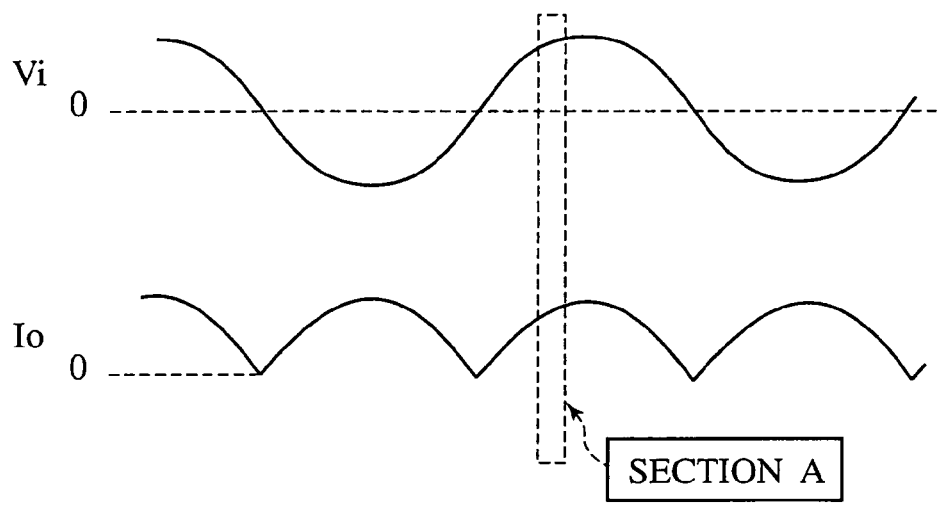
FIG. 4 is a timing chart for an alternating current power-supply voltage waveform and a rectified output current waveform of the power factor correction circuit of the first embodiment.
Figure 5:
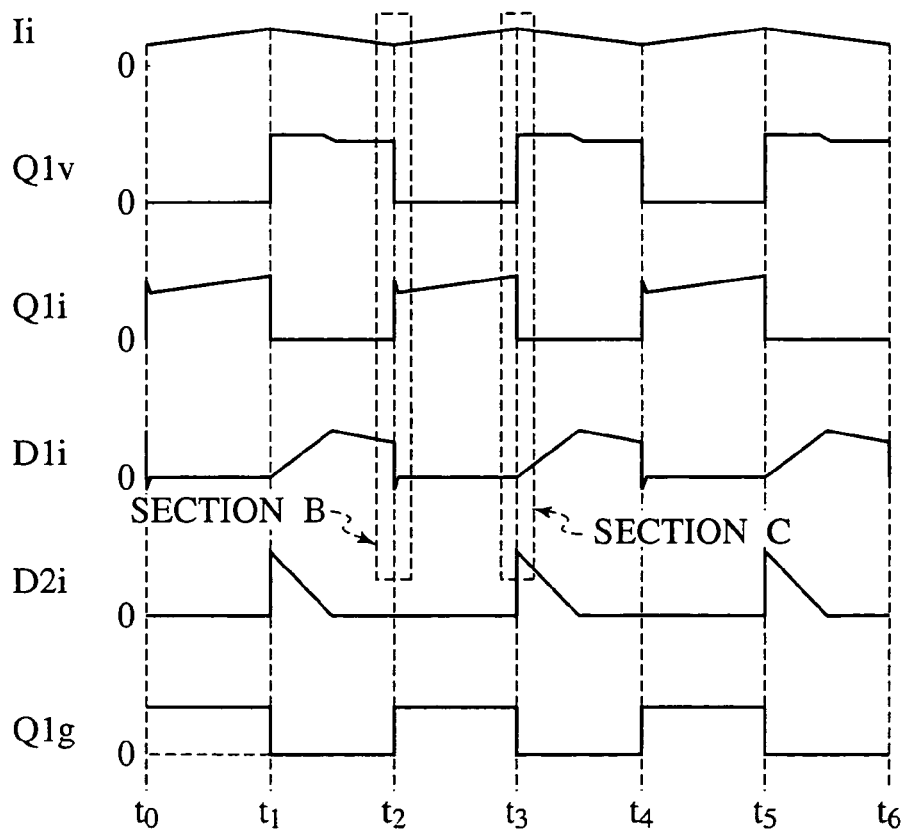
FIG. 5 is a timing chart for signals of various parts of the power factor correction circuit of the first embodiment.
Figure 6:
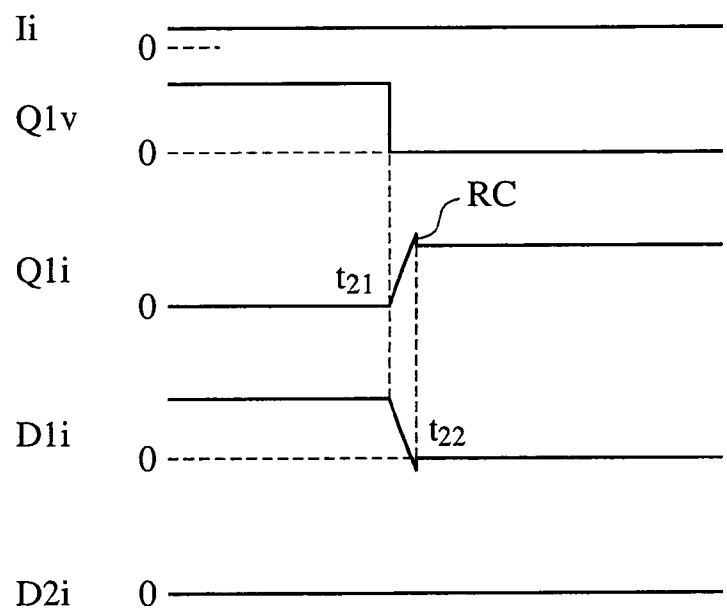
FIG. 6 is a timing chart for signals of various parts of a switch Q1, during its turned-on state, of the power factor correction circuit of the first embodiment.
Figure 7:
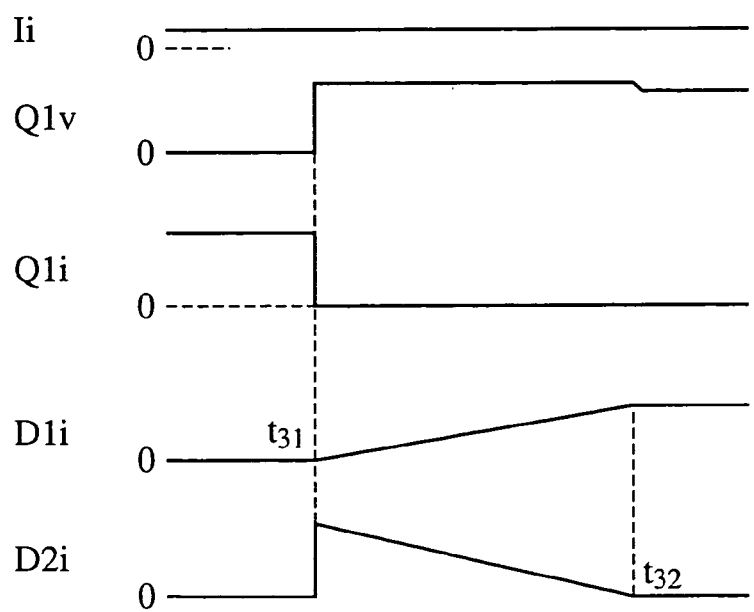
FIG. 7 is a timing chart for signals of various parts of a switch Q1, during its turned-off state, of the power factor correction circuit of the first embodiment.

Now, operation of the power factor correction circuit of the first embodiment with such a structure is described below with reference to a timing chart shown in FIGS. 4 to 7. FIG. 4 shows a timing chart of an alternating current power-supply voltage waveform and a rectified output current waveform of the power factor correction circuit of the first embodiment. FIG. 5 shows a timing chart for signals associated with various component parts of the power factor correction circuit of the first embodiment. FIG. 6 shows a timing chart for signals associated with the various component parts of the power factor correction circuit of the first embodiment during a turned-on state of the switch Q1. FIG. 7 shows a timing chart for signals associated with various component parts of the power factor correction circuit of the first embodiment during a turned-off state of the switch Q1.

Also, FIG. 4 shows the alternating current power-supply voltage Vi and a rectified output current 1o. FIG. 5 shows a detail of a section A of FIG. 4. FIGS. 5 to 7 show an input current Ii flowing through the alternating current power-supply, a voltage Q1v applied across the both terminals of the switch Q1, a current Q1i flowing through the switch Q1, a current D1i flowing through the diode D1, and a current D2i flowing through the diode D2. Q1 control signal Q1g designates a signal to be applied to a gate of the switch Q1.

First, as the switch Q1 is turned on at time t2 (t21), a current flows in a path expressed as Vac1→B1→5a→L2→Q1→R→B1→Vac1 due to a voltage resulting from the alternating current power-supply voltage Vi being rectified. For this reason, the voltage is applied to the ZCS reactor L2 and the current Q1i flowing through the switch Q1 increases at an inclination of Vac1/L2 during a time interval from time t21 to time t22. Accordingly, the current Q1i flowing through the switch Q1 begins from zero and the switch Q1 achieves ZCS operation. As apparent from FIG. 6, the current rises after the switch Q1 is turned on to accomplish the ZCS operation.

Further, from time t21 to time 22, the current of the ZCS reactor L2 increases and at the same time, the current D1i flowing through the diode D1 decreases to zero and the diode D1 turns off. During a recovery time, although a spike current flows through the switch Q1 due to a recovery of the diode D1, an impedance of the ZCS reactor L2 limits this spike current. As shown in FIG. 6, at time t22, a spike current RC resulting from the recovery of the diode is slightly observed.

Upon termination of the recovery time, a reverse direction of the diode D1 is recovered and a rate of increase in current of the ZCS reactor L2 decreases. The voltage is applied to the booster winding 5a of the booster reactor L1 and the current Q1i flows in a path expressed as Vac1→B1→5a→L2→Q1→R→B1→Vac1 and the current Q1i increases at an inclination of Vac1/5a (from time t21 to time t22)

Then, as the switch Q1 is turned off at time t3 (time 31), a current D1i flows from time t3 to time t4 in a path expressed as 5a→5b→D1→C1→R→B1→Vac1→5a due to energy stored in the booster winding 5a of the booster reactor L1. For this reason, the smoothing capacitor C1 is charged, thereby supplying electric power to the load RL.

Likewise, at time t3 (t31), the voltage Q1v of the switch Q1 increases due to energy stored in the ZCS reactor L2. Also, a current D2i flows in a path expressed as L2→D2→C1→R→B1→Vac1→5a→L2 due to energy stored in the ZCS reactor L2. That is, energy stored in the ZCS reactor L2 is regenerated to the load RL via the diode D2. The magnitude of energy appearing this time is determined by the voltage occurring in the wind-up winding 5b of the booster reactor L1 and the current flowing through the reactor L2 and as a junction between the booster coils 5a and 5b, i.e., a tap is closer to an input, the generated voltage increases to terminate the discharging in a short period of time.

At time t32 at which this discharging is completed, the current D2i of the diode D2 becomes zero and after a reversed characteristic is recovered, if the switch Q1 is turned on again at time t4, the ZCS operation continues. Also, the control circuit 10 controls an on-duty of the switch Q1 so as to create a waveform equal to that of the alternating current power-supply voltage Vi that is inputted, thereby enabling a power factor correction circuit of a booster type to be structured.

Thus, with the power factor correction circuit of the first embodiment, the presence of the ZCS reactor L2 connected to the switch Q1 in series precludes the occurrence of the spike current that would be caused by diode recovery during turned-on state of the switch Q1. For this reason, noises can be reduced and a noise filter can be minimized in structure, making it possible to achieve miniaturization and increased efficiency in switching power-supply.

Further, by allowing the switch Q1 to operate on ZCS during the turned-on state, switching losses and switching noises can be reduced, thereby enabling high efficiency and low noises to be achieved.

Figure 8:
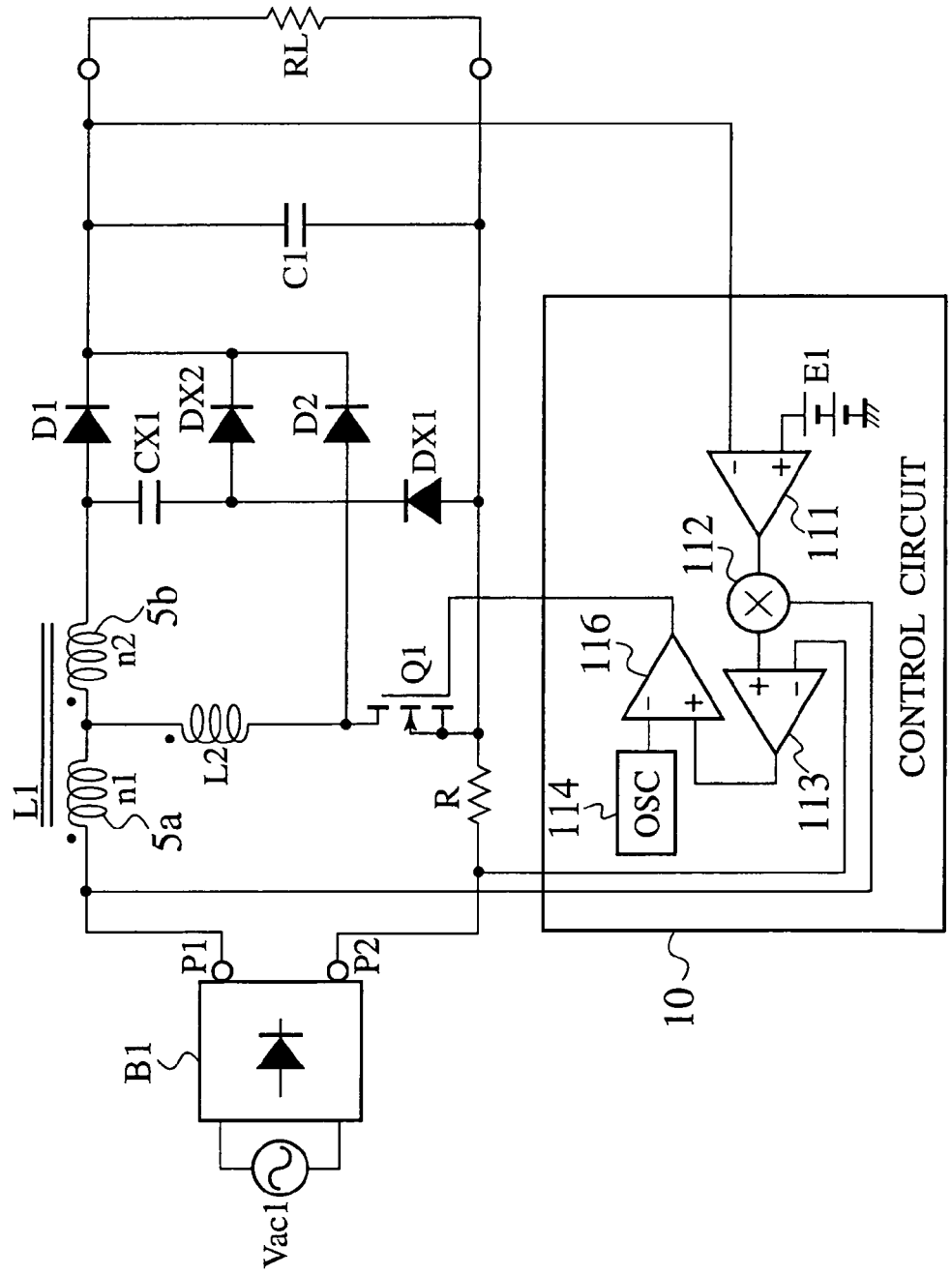
FIG. 8 is a circuit structural view illustrating a modified form of the power factor correction circuit of the first embodiment.

FIG. 8 is a circuit structural view illustrating a modified form of the power factor correction circuit of the first embodiment. The power factor correction circuit of this modified form features to additionally include, in addition to the structure of the power factor correction circuit of the first embodiment shown in FIG. 3, a capacitor CX1, a diode DX1 and a diode DX2 for thereby decreasing losses (that is, the spike current and the spike voltage that would occur during recovery time of the diode D1) resulting from the recovery of the diode.

Connected between a junction, between the wind-up winding 5b of the booster reactor L1 and the diode D1, and a junction between the switch Q1 and the current detection resistor R is a series circuit that is comprised of the capacitor CX1 and the diode DX1. The diode DX2 is connected between a junction, between the capacitor CX1 and the diode DX1, and the smoothing capacitor C1.

Also, the other structure of this modified form is identical to that of the power factor correction circuit of the first embodiment shown in FIG. 3 with the same component parts bearing the reference numerals as those of the first embodiment and description of the same is herein omitted.

Figure 9:
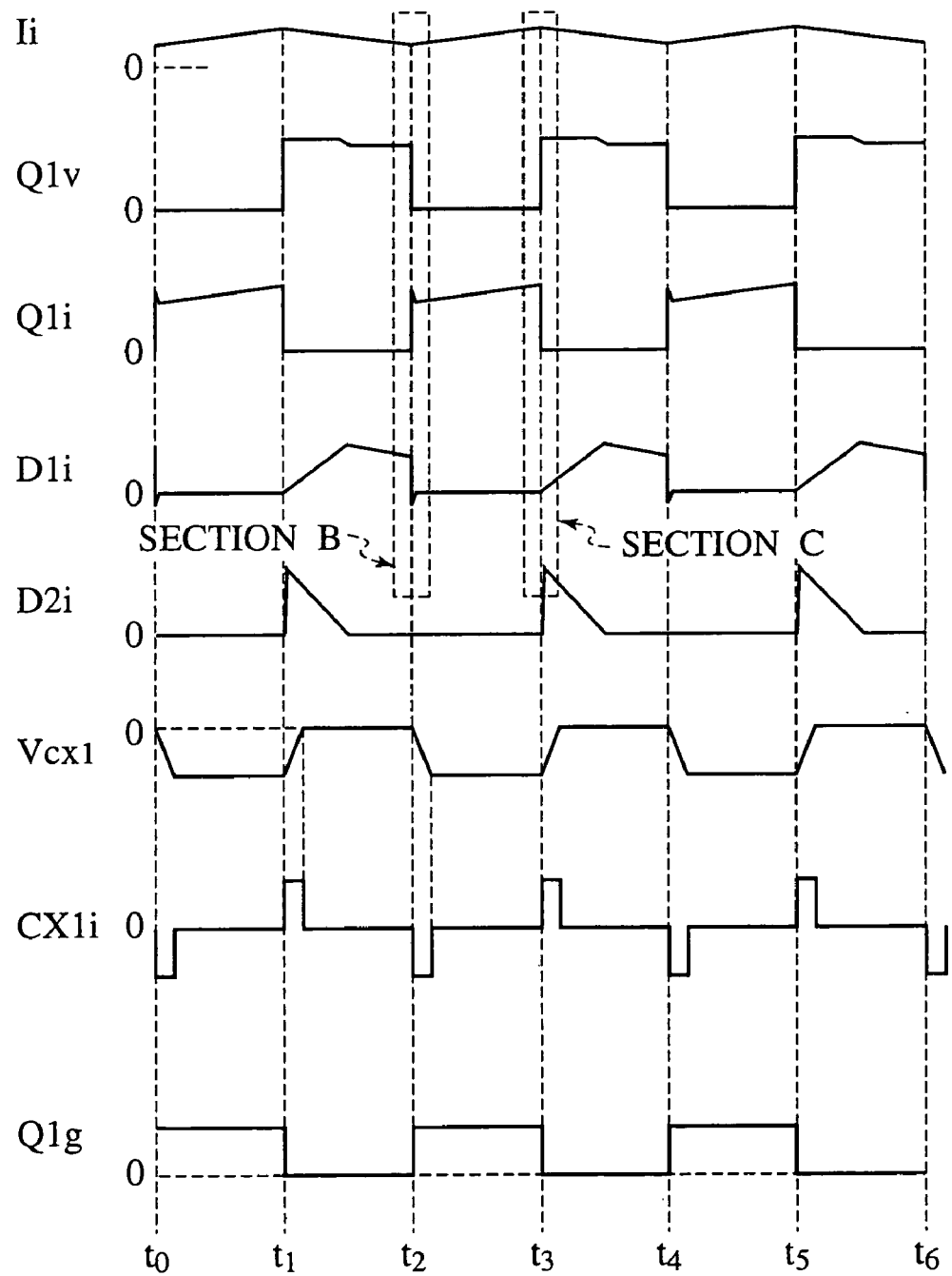
FIG. 9 is a timing chart for signals of various parts of a power factor correction circuit of the first embodiment according to the present invention.

Next, operation of the power factor correction circuit of the modified form of the first embodiment with such a structure is described with reference to a timing chart shown in FIG. 9. FIG. 9 shows the timing chart for selected signals associated with various component parts of the power factor correction circuit of the modified form of the first embodiment.

FIG. 9 shows an input current Ii flowing through the alternating current power-supply, a voltage Q1v appearing across the both terminals of the switch Q1, a current Q1i flowing through the switch Q1, a current D1i flowing through the diode D1, a current D2i flowing through the diode D2, a voltage VCX1 appearing across the both terminals of the capacitor CX1 and a current CX1i flowing through the capacitor CX1. Q1 control signal Q1g designates a signal applied to the gate of the switch Q1.

First, as the switch Q1 is turned on at time t2, a current flows in a path expressed as Vac1→B1→5a→L2→Q1→R→B1→Vac1 due to a rectified voltage resulting from the alternating current power-supply voltage Vi. For this reason, the voltage is applied to the ZCS reactor L2 and the current Q1i flowing through the switch Q1 increases at an inclination of Vac1/L2. Accordingly, the current Q1i flowing through the switch Q1 begins from zero and the switch Q1 executes ZCS operation.

Further, concurrent with an increase in the current of the ZCS reactor L2, the current D1i flowing through the diode D1 decreases to zero, thereby rendering the diode D1 to a turned-off state. During recovery time, although the spike current flows through the switch Q1 due to the recovery of the diode D1, this spike current is limited by impedance of the ZCS reactor L2.

Furthermore, the current CX1i flows in a path expressed as 5b→L2→Q1→DX1→CX1→5b, thereby charging the capacitor CX1. When this takes place, since a terminal of the capacitor CX1, closer to the diode DX1, plays a role as a positive electrode, the terminal voltage VCX1 of the capacitor CX1 falls in a negative voltage as shown in FIG. 9, thereby causing the current CX1i, flowing through the capacitor CX1, to fall in a negative current.

That is, the spike current, caused by recovery of the diode DX1, is charged to the capacitor CX1 by the action of the ZCS reactor L2, enabling the spike current to be further reduced.

Upon termination of recovery time, the reversed direction of the diode D1 is recovered, thereby decreasing the rate of increase in the current of the ZCS reactor L2. The input voltage is added with the voltage of the booster winding 5a of the booster reactor L1 and the current Q1i flows in a path expressed as Vac1→B1→5a→L2→Q1→R→B1→Vac1 to vary such that the current Q1i increases at an inclination of Vac1/5a.

Then, at time t3, as the switch Q1 is turned off, the current D1i flows from time t3 to time t4 in a path as expressed as 5a→5b→D1→C1→R→B1→Vac1→5a due to energy stored in the booster winding 5a of the booster reactor L1. Thus, the smoothing capacitor C1 is charged and the load RL is supplied with electric power.

Likewise, at time t3, the voltage Q1v of the switch Q1 increases due to energy stored in the ZCS reactor L2. Also, the current D2i flows in a path expressed as L2→D2→C1→R→B1→Vac1→5a→L2. That is, energy stored in the ZCS reactor L2 is regenerated in the load RL via the diode D2.

Further, the current CX1i flows in a path expressed as Vac1→B1→5a→5b→CX1→DX2→R→B1→Vac1, thereby charging the capacitor CX1. When this takes place, since the terminal of the capacitor CX1, closer to the diode DX1, plays a role as a negative electrode, the terminal voltage VCX1 of the capacitor CX1 reaches a nearly zero voltage and the current CX1i flowing through the capacitor CX1 becomes a positive current.

At time t3, the current D2i of the diode D2 becomes zero to allow the diode D2 to recover a reversed characteristic and, thereafter, at time t4 again, the switch Q1 is turned on, thereby enabling the same to continuously remain in the ZCS operation.

Thus, the power factor correction circuit, of the modified form of the first embodiment, has in addition to advantageous effects of the power factor correction circuit of the first embodiment, enables further reduction in losses caused by the diode recovery.

(Second Embodiment)

Figure 10:
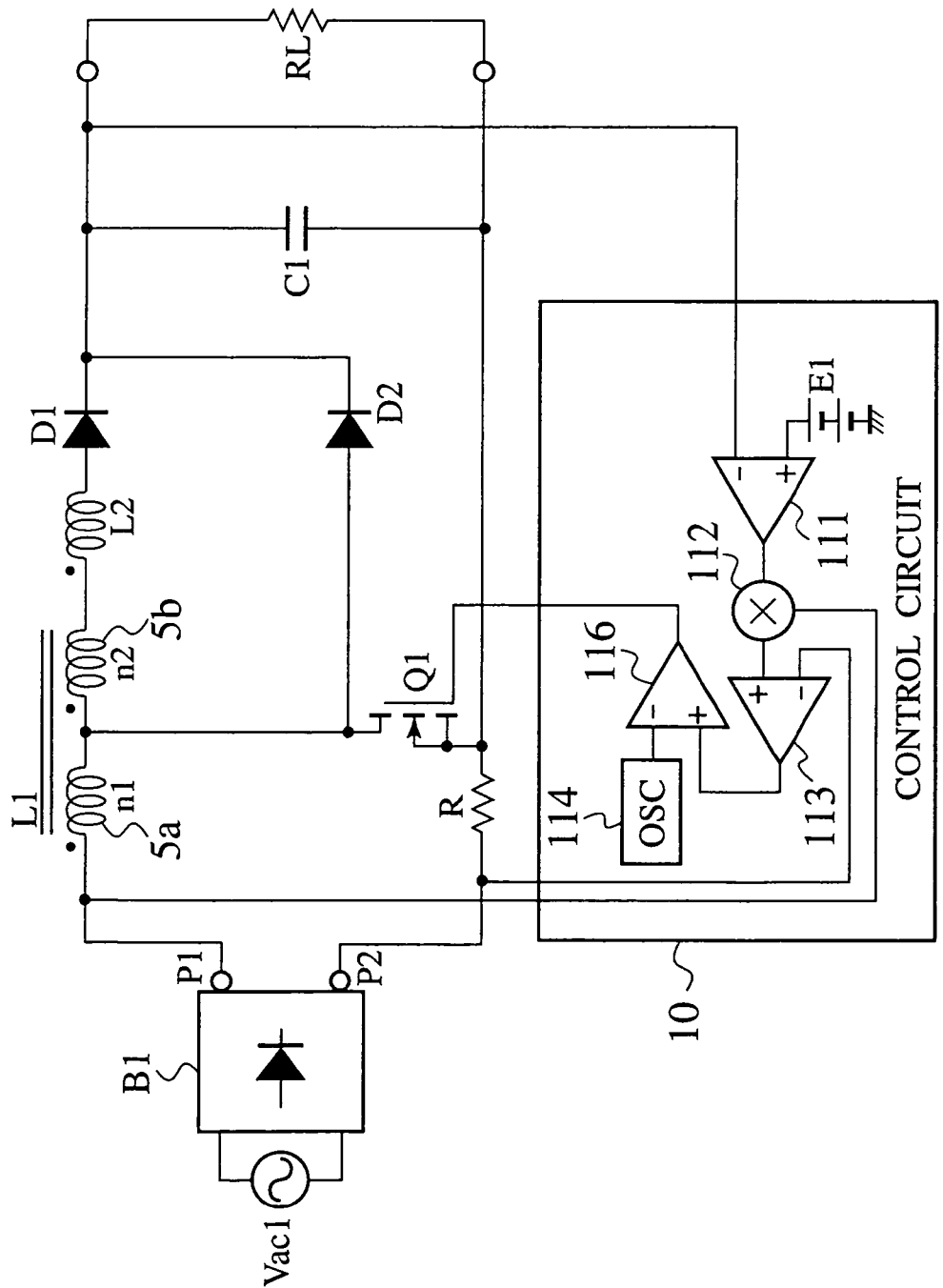
FIG. 10 is a circuit structural view illustrating the power factor correction circuit of a second embodiment.

FIG. 10 is a circuit structural view of a power factor correction circuit of a second embodiment. The power factor correction circuit of the second embodiment, shown in FIG. 10, differs from the power factor correction circuit of the first embodiment, shown in FIG. 3, in that the ZCS reactor L2 is connected between the booster reactor L1 and the diode D1. The ZCS reactor L2 may be structured with a leakage inductor between the booster winding 5a and the wind-up winding 5b of the booster reactor L1.

Figure 11:
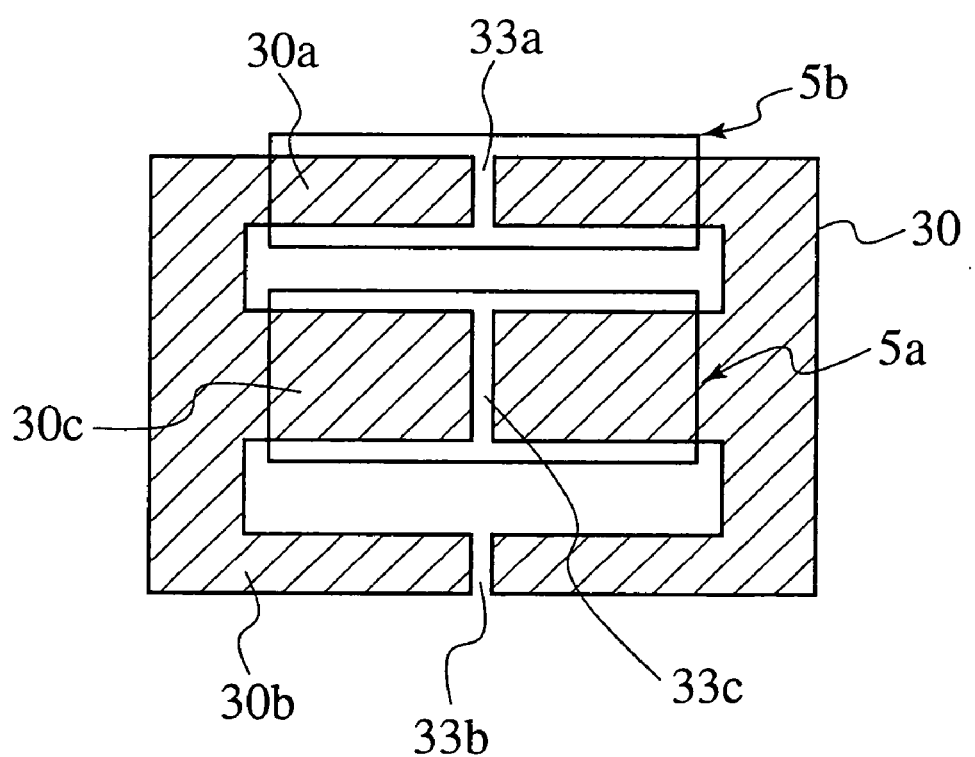
FIG. 11 is a structural view of a booster reactor provided in the power factor correction circuit of the second embodiment.

FIG. 11 is a structural view showing a structure of the booster reactor L1 provided in the power factor correction circuit of the second embodiment. The booster reactor L1, shown in FIG. 11, which has a central leg 30c and side legs 30a, 30b, includes a core (iron core) 30 composed of E-shaped core elements, each made of magnetic material, in which a magnetic circuit is formed. The core 30 is made of a magnetic body such as ferrite having high permeability with less iron losses. The permeability of the core 30 lies in a value ranging from approximately 3000 to 4000. The central leg 30c and the side legs 30a, 30b have the same gaps 33a, 33b, 33c, respectively. The booster winding 5a is wound on the central leg 30a; the wind-up winding 5b is wound on one side leg 30a; and the other side leg 30b serves as a bus core. This allows a magnetic flux to be generated by the central leg 30c, with the magnetic flux being distributed to the side legs 30a, 30b at an equal rate. Thus, with the core 30 formed with the gaps 33a, 33b, 33c with the same thickness, suppose a cross-sectional surface area of the central leg 30c is "1", both the side legs 30a, 30b have cross-sectional surface areas of ½. Further, the booster winding 5a and the wind-up winding 5b are magnetically coupled in a coarse condition with resultant increased leakage inductances by which L2 can be formed. Furthermore, the respective gaps 33a, 33b, 33c may be provided with magnetic bodies that vary in permeability depending on the currents flowing through the respective windings 5a, 5b. An example of such a magnetic body may include a plastic magnetic body formed of magnetic powder, such as ferrite, which is mixed in plastic material. This makes it possible to fabricate a booster reactor that is small in size and hard to be magnetically saturated.

Moreover, the other structure shown in FIG. 10 has the same structure as that of FIG. 3 and the same component parts bear like reference numerals to omit detailed description of the same.

The power factor correction circuit shown in FIG. 3 is equivalent to the power factor correction circuit shown in FIG. 10 to operate in the same manner as the power factor correction circuit shown in FIG. 10 and the operation of the same is simply described.

First, as the switch Q1 is turned on at time t2, the current Q1$i$ flows in a path expressed as Vac1→B1→5a→Q1→R→B1→Vac1 due to the voltage obtained by rectifying the alternating current power-supply voltage Vi. The current Q1$i$ of the switch Q1 begins from zero and the switch Q1 executes the ZCS operation.

In this moment, the current D1$i$ flowing through the diode D1 decreases to zero, thereby turning off the diode D1. During recovery time, although the spike current flows through the switch Q1 due to the recovery of the diode D1, this spike current is limited by impedance of the ZCS reactor L2.

Then, as the switch Q1 is turned off at time t31, the current, flowing through the booster reactor L1, does not rapidly flow through the ZCS reactor L2 due to energy stored in the booster reactor L1 when the switch Q1 is turned on. That is, a current, which is equal to a difference between the current, flowing through the booster reactor L1, and the current, flowing through the ZCS reactor L2, flows as a current D2 through the smoothing capacitor C1 via the diode D2 to supply electric power to the load RL. The current D2$i$ linearly decreases during a period from time t31 to time t32.

Further, due to energy stored in the ZCS reactor L2, the current, flowing through the ZCS reactor L2, flows through the smoothing capacitor C1 as a current D1$i$ via the diode D1 to supply electric power to the load RL. The current D1$i$ linearly increases during a time period from time t31 to time t32.

When the current flowing through the ZCS reactor L2 equals to the current flowing through the booster reactor L1 (at time t32), the current D2$i$ flowing through the diode D2 is zeroed.

Then, as the switch Q1 is turned on at time t4 (also at time t2), the current of the ZCS reactor L2 linearly decreases to zero at which the diode D1 is turned off. As shown in FIG. 6, with a decrease in the current (equal to the current D1) flowing through the ZCS reactor L2, the current Q1$i$ of the switch Q1 increases and equals to the current flowing through the booster reactor L1, at which the current of the ZCS reactor L2 is zeroed. Accordingly, the switch Q1 executes the ZCS operation lie in FIG. 6.

Thus, the power factor correction circuit of the second embodiment has the same advantageous effects as those of the power factor correction circuit of the first embodiment and is further advantageous in that since the ZCS reactor L2 connected to the booster reactor L1 in series can be formed of the leakage inductor between the booster winding 5a and the wind-up winding 5b of the booster reactor L1, the booster reactor L1 and the ZCS reactor L2 are integrated to provide an ease of fabricating the reactor.

Figure 12:
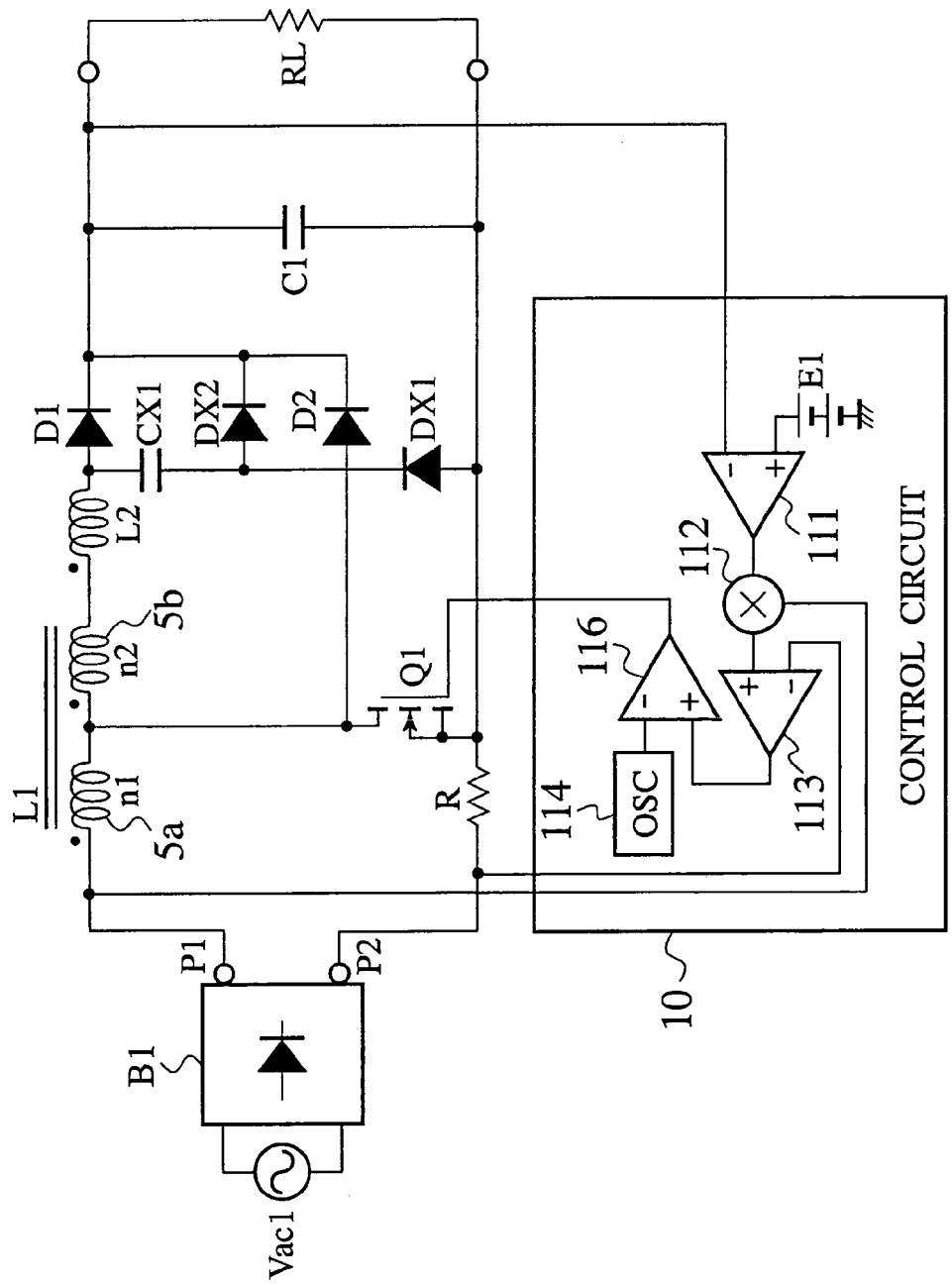
FIG. 12 is a circuit structural view illustrating a modified form of the power factor correction circuit of the second embodiment.

FIG. 12 is a circuit structural view of a power factor correction circuit of a modified form of the second embodiment. The power factor correction circuit of this modified form features, in addition to the structure of the power factor correction circuit shown in FIG. 10, to have the capacitor CX1, the diode DX1 and the diode DX2 by which diode recovery (that is, spike current or spike noises that would occur during recovery of the diode D1) is reduced.

Connected between a junction, between the ZCS reactor L2 and the diode D1, and a junction, between the switch Q1 and the current detection resistor R is a series circuit that includes the capacitor CX1 and the diode DX1. Connected between a junction between capacitor CX1 and the diode DX1 and the smoothing capacitor C1 is the diode DX2.

Also, the other structure of this modified form is identical to the structure of the power factor correction circuit of the second embodiment, shown in FIG. 10, and the same component parts bear like reference numerals to omit description of the same.

Now, description is made of the operation of the power factor correction circuit of the modified form of the second embodiment with such a structure.

As the switch Q1 is turned on, a current flows in a path expressed as C1→D1→L2→5b→Q1→C1 due to the recovery of the diode D1 and this current is shut off upon termination of the recovery of the diode D1. When this takes place, a voltage occurs in the ZCS reactor on a direction to cause the diode D1 to be reverse-biased. Due to the occurrence of this voltage, a current flows in a path expressed as L2→5b→Q1→DX1→CX1→L2 and an electric charge is stored in the capacitor CX1. Then, as the switch Q1 is turned off, a current flows in a path expressed as Vac1→B1→L1→L2→CX1→DX2→C1→R→B1→Vac1 and this electric charge is circulated to the load RL.

Thus, the power factor correction circuit of the modified form of the second embodiment has the same advantageous effects as those of the power factor correction circuit of the second embodiment and, in addition thereto, an advantage of achieving further reduction in losses resulting from the recovery of the diode.

(Third Embodiment)

Figure 13:
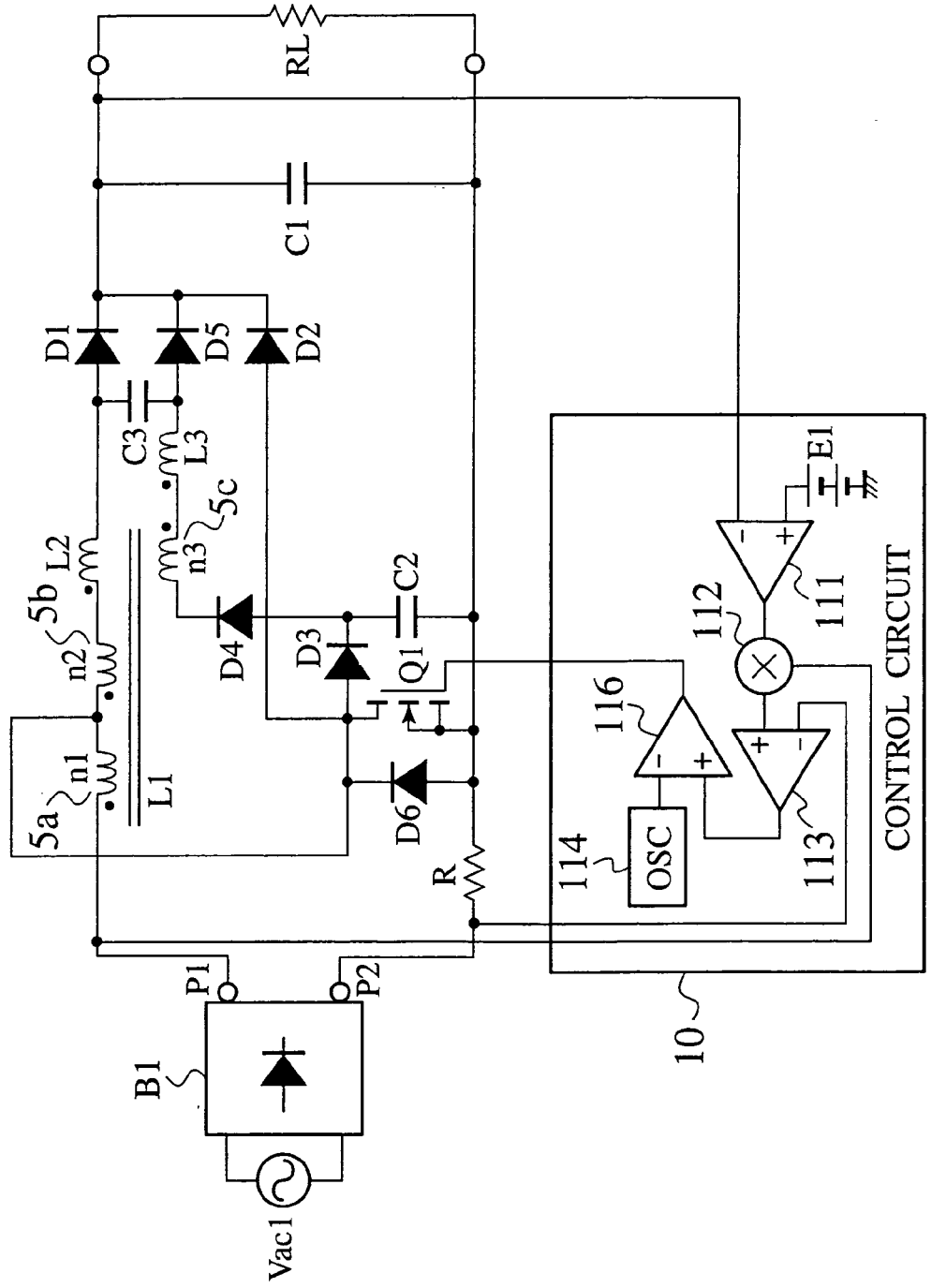
FIG. 13 is a circuit structural view illustrating a power factor correction circuit of a third embodiment.

FIG. 13 is a circuit structural view of a power factor correction circuit of a third embodiment. The power factor correction circuit of the third embodiment contemplates to render the power factor correction circuit of the second embodiment, shown in FIG. 10, operative such that the switch Q1 executes the ZCS operation during a turned-on period while, at the same time, collecting electrical charge of a snubber capacitor C2 and permitting the switch Q1 to execute ZVS (zero-voltage switching) operation during turned-off of the switch Q1. This enables reduction in losses resulting from the recovery of the rectifying diode and permits the electric current to slowly change, enabling switching operation at high efficiency with low noises. That is, by charging the snubber capacitor C2 via a diode D5 when the switch Q1 is turned off, the rising of the voltage of the switch Q1 is alleviated to decrease losses during the turned-off state of the switch Q1 while minimizing the occurrence of noises.

With the power factor correction circuit shown in FIG. 13, connected to the switch Q1 in parallel is a third series circuit that is comprised of the diode D3 and the snubber capacitor C2. Further, a diode D6 is connected to the switch Q1 in parallel thereto. The diode D6 and the snubber capacitor C2 may include a parasitized diode and a parasitized capacitor of the switch Q1.

Connected between a junction, between the diode D3 and the snubber capacitor C2, and the diode D1 is a fourth series circuit that is comprised of a regenerative winding 5c (with the number of turns of n3), a current-limiting reactor L3 and a regenerative capacitor C3. A diode D5 is connected between a junction, between the regenerative capacitor C3 and the current-limiting reactor L3, and a junction between a cathode of the diode D1 and the smoothing capacitor C1.

The ZCS reactor L2 includes a leakage inductor between the booster winding 5a and the wind-up winding 5b of the booster reactor L1. The current-limiting reactor L3 is comprised of a leakage inductor between the booster winding 5a and the regenerative winding 5c of the booster reactor L1.

Also, the other structure, shown in FIG. 13, has the same structure as that of FIG. 3 and the same component parts bear like reference numerals to omit detailed description of the same.

Figure 14A:
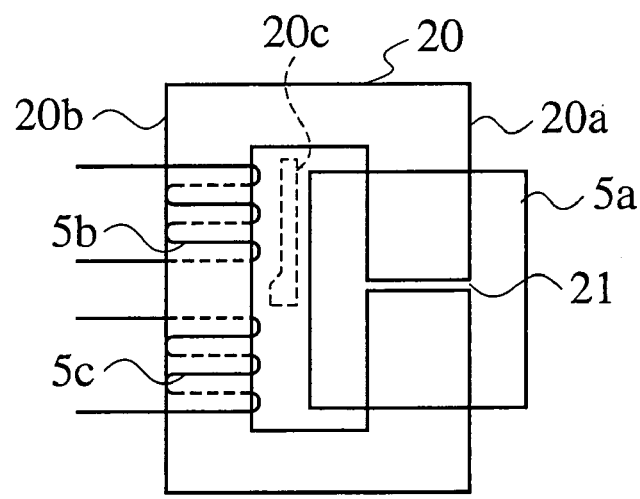
FIGS. 14A and 14B are structural views of the booster reactor provided in the power factor correction circuit of the third embodiment.
Figure 14B:
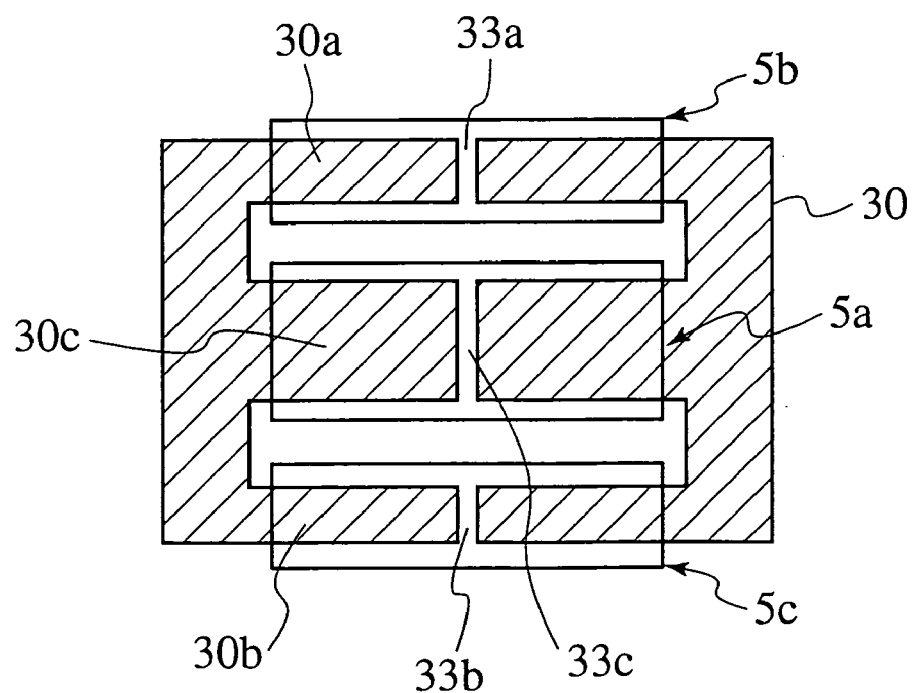

FIGS. 14A and 14B are structural views of the booster reactor provided in the power factor correction circuit of the third embodiment.

The booster reactor L1, shown in FIG. 14A, includes an "O"-shaped core (iron core) 20 and a leg-A 20a of the core 20 is formed with a gap 21 at one position and wound with the booster winding 5a. Wound on a leg-B 20b are the wind-up winding 5b and the regenerative winding 5c. The wind-up winding 5b and the regenerative winding 5c are wound on the core 20 to fall in nondense coupling with the booster winding 5a.

For this reason, a leakage inductor between the booster winding 5a and the wind-up winding 5b of the booster reactor L1 increases and, hence, this leakage inductor can be used as the ZCS reactor L2. Also, a leakage inductor between the booster winding 5a and the regenerative winding 5c of the booster reactor L1 increases and, hence, this leakage inductor can be used as the current-limiting reactor L3.

Further, if an increased inductance is needed, a magnetic bypass root, such as a pass core 20c (indicated by a dotted line in FIG. 14A), may be provided among the wind-up winding 5b, the booster winding 5a and the regenerative winding 5c of the booster reactor L1. That is, for the purpose of forming the magnetic bypass root in connection only with the wind-up winding 5b, the pass core 20c is placed in close proximity to the wind-up winding 5b. With such an arrangement, the presence of a magnetic flux, which bypasses to the pass core 20c, enables reduction in the magnetic flux penetrating the wind-up winding 5b, making it possible to obtain a further increased leakage inductor.

Further, a magnetic body, which varies in permeability depending on the currents flowing through the respective windings 5a, 5b, can be provided in the gap 21. Such a magnetic body may include a plastic magnet body in which magnetic powder, such as ferrite, is mixed in plastic material. This enables the booster reactor, which is small in size and hard to be magnetically saturated, to be manufactured.

Furthermore, the booster reactor L1, shown in FIG. 14B, includes a core (iron core) 30, composed of E-shaped core elements, each made of magnetic material, in which a magnetic circuit is formed, that has a central leg 30c and side legs 30a, 30b. The core 30 is made of a magnetic body, such as ferrite, which has a high permeability with less iron losses. The permeability of the core 30 may lie in a value ranging from 3000 to 4000. The central leg 30c and the side legs 30a, 30b of the core 30 are formed with gaps 33a, 33b, and 33c with the same thickness, respectively. The booster winging 5a is wound on the central winding 30c and the wind-up winding 5b is wound on one side leg 30a while the regenerative winding 5c is wound on the other side leg 30b. This allows the magnetic flux to be equally distributed to both of the side legs 30a, 30b. Thus, by providing the gaps 33a, 33b, 33c with the same thickness in the core 30, suppose that the central leg 30c has a cross sectional area of "1", the both side legs 30a, 30b have a cross sectional area of ½. Also, since the booster winding 5a, the wind-up winding 5b and the booster winding 5a, and the regenerative winding 5c remain in a nondense magnetic coupling, increased leakage inductors are obtained by which L2, L3 are structured.

Moreover, the respective gaps 33a, 33b, 33c may be provided with the magnetic bodies each of which varies in permeability depending on the currents flowing through each of the windings 5a, 5b, 5c. Such a magnetic body may include a plastic magnetic body formed of plastic material mixed with magnetic powder such as ferrite. This enables the fabrication of the booster reactor that is small in size and hard to be magnetically saturated.

Figure 15:
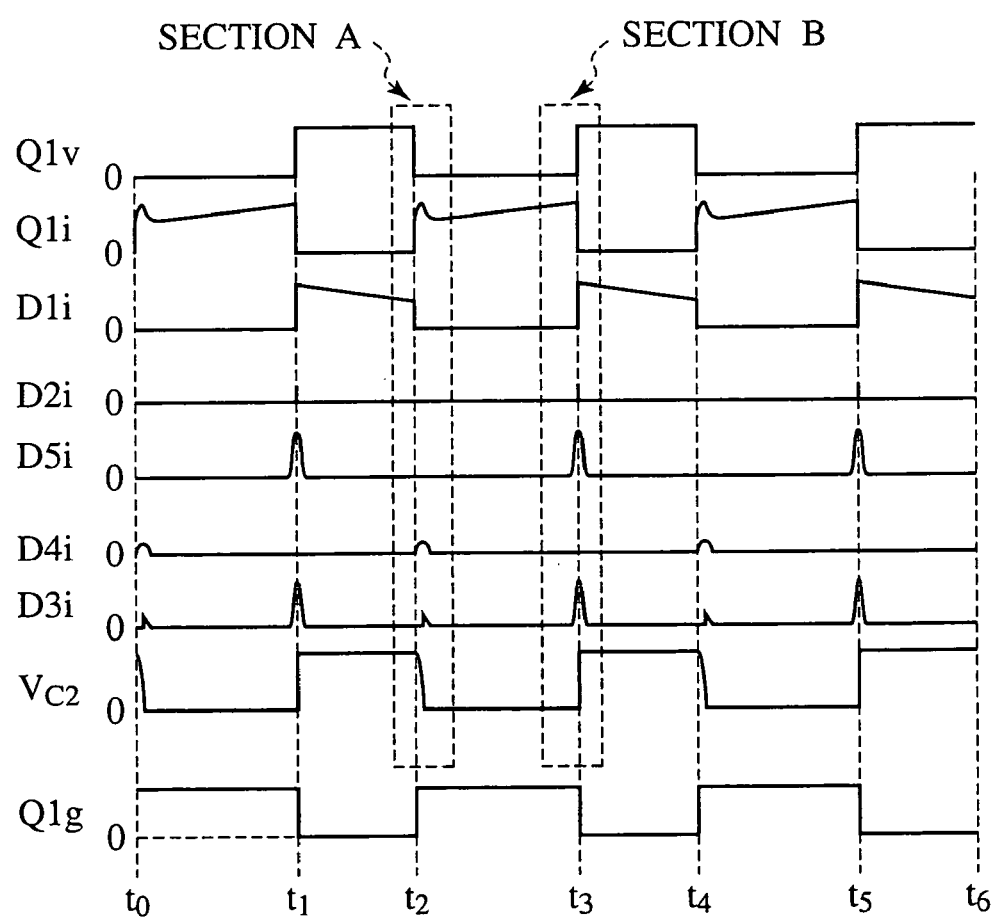
FIG. 15 is a timing chart for signals of various parts of the power factor correction circuit of the third embodiment.
Figure 16:
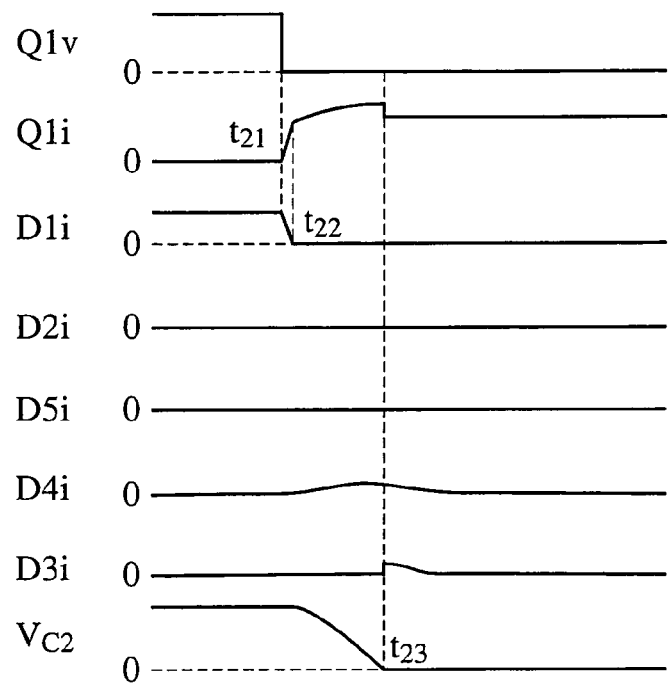
FIG. 16 is a timing chart for signals of various parts of a switch Q1, during its turned-on state, of the power factor correction circuit of the third embodiment.
Figure 17:
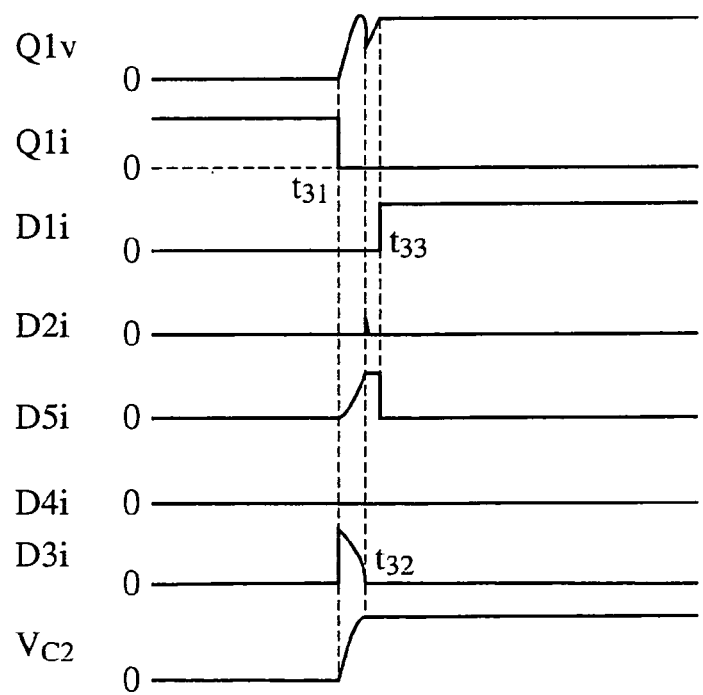
FIG. 17 is a timing chart for signals of various parts of a switch Q1, during its turned-off state, of the power factor correction circuit of the third embodiment.

Now, operation of the power factor correction circuit of the third embodiment with such a structure is described with reference to timing chart shown in FIGS. 15 to 17. FIG. 15 shows a timing chart for signals at respective component parts of the power factor correction circuit of the third embodiment. FIG. 16 is shows a timing chart for signals of the respective component parts of the power factor correction circuit of the third embodiment during turned-on state of the switch Q1. FIG. 17 shows a timing chart for signals of the respective component parts of the power factor correction circuit of the third embodiment during a turned-off state of the switch Q1.

Also, FIGS. 15 to 17 show the voltage Q1v appearing across the switch Q1, the current Q1i flowing through the switch Q1, the current D1i flowing through the diode D1, the current D2i flowing through the diode D2, the current D3i flowing through the diode D3, the current D4i flowing through the diode D4, the current D5i flowing through the diode D5 and the voltage Vc2 appearing across the snubber capacitor C2. Q1 control signal Q1g designates the signal to be applied to the gate of the switch Q1.

First, as the switch Q1 is turned on at time t2 (t21), due to a rectified voltage of the alternating current power-supply voltage V1, a current flows in a path expressed as Vac1→B1→5a→Q1→R→B1→Vac1. Since the current Q1i of the switch Q1 begins from zero, the switch Q1 executes the ZCS operation.

In this moment, the electric charge of the snubber capacitor C2 is released in a path expressed as C2→D4→5c→L3→C3→L2→5b→Q1→C2 to allow the current D4i to flow. For this reason, energy is stored in the booster reactor L1 and the regenerative capacitor C3 via the regenerative winding 5c and the wind-up winding 5b of the booster reactor L1. That is, the electric charge of the capacitor C2 is recovered to the booster reactor L1 and the regenerative capacitor C3.

Due to the voltage of the regenerative winding 5c of the booster reactor L1 being added to the voltage of the snubber capacitor C2, the capacity of the regenerative capacitor C3 enables the terminal voltage Vc2 of the snubber capacitor C2 to be discharged to zero in the substantially same capacity. For this reason, the terminal voltage Vc2 progressively decreases to be zeroed at time t23.

Next, as the switch Q1 is turned off at time t3 (t31), the current D2i flows through the smoothing capacitor C1 via the diode D2 to supply electric power to the load RL at time t32 due to energy stored in the booster reactor L1. Also, due to energy stored in the booster reactor L1, the current D1i flows through the smoothing capacitor C1 via the diode D1 to supply electric power to the load RL at time t33. Moreover, due to energy of the booster reactor L1, the current D1i flows to the smoothing capacitor C1 via the diode D1 at time t33, thereby supplying electric power to the load RL.

Further, during a time period from t3i to t33, due to energy of the regenerative capacitor C3, a current D5i flows in a path as expressed as 5a→5b→L2→C3→D5→C1→R→B1→Vac1→B1→5a to supply electric power to the load RL.

Further, during the time period from time t31 to time t32, the snubber capacitor C2 is charged via the diode D3 due to energy of the booster reactor L1 and the voltage Vc2 of the snubber capacitor C2 slowly rises up from zero. For this reason, since the voltage Q1v of the switch Q1 also slowly rises up from zero, the switch Q1 executes the ZVS operation when turned off. Accordingly, this results in reduction in losses during the turned-off state of the switch Q1, while enabling reduction in noises. It will be appreciated from FIG. 17 that the ZVS operation is accomplished when the switch Q1 is turned off.

With the power factor correction circuit of the third embodiment, thus, by permitting the switch Q1 to execute the ZCS operation when turned off while at the same time permitting the switch Q1 to execute the ZVS operation when turned off, losses resulting from recovery of the rectifying diode can be eliminated while permitting the current to vary in a gradual manner, enabling the switching operation to be executed at high efficiency with low noises.

Further, the ZCS reactor L2 and the current-limiting reactor L3 are able to limit the current when the switch Q1 is turned on, resulting in the flow of a low peak current.

That is, the spike voltage RC is reduced and losses of the diode can be eliminated. Also, the presence of the current-limiting reactor L3 larger than the ZCS reactor L2 enables further reduction in a reverse-biased voltage (spike voltage RC) of the diode D1 when the switch Q1 is turned on.

Also, while the third embodiment, shown in FIG. 13, includes, in addition to the structure of the second embodiment, a new structure that additionally includes the regenerative winding 5c, the current-limiting reactor L3, the regenerative capacitor C3, the diodes D3 to D6 and the snubber capacitor C2, a modified form of the third embodiment may further include, in addition to the structure of the first embodiment, a new structure that incorporates the regenerative winding 5c, the current-limiting reactor L3, the regenerative capacitor C3, the diodes D3 to D6 and the snubber capacitor C2 with similar advantageous effects.

Figure 18:
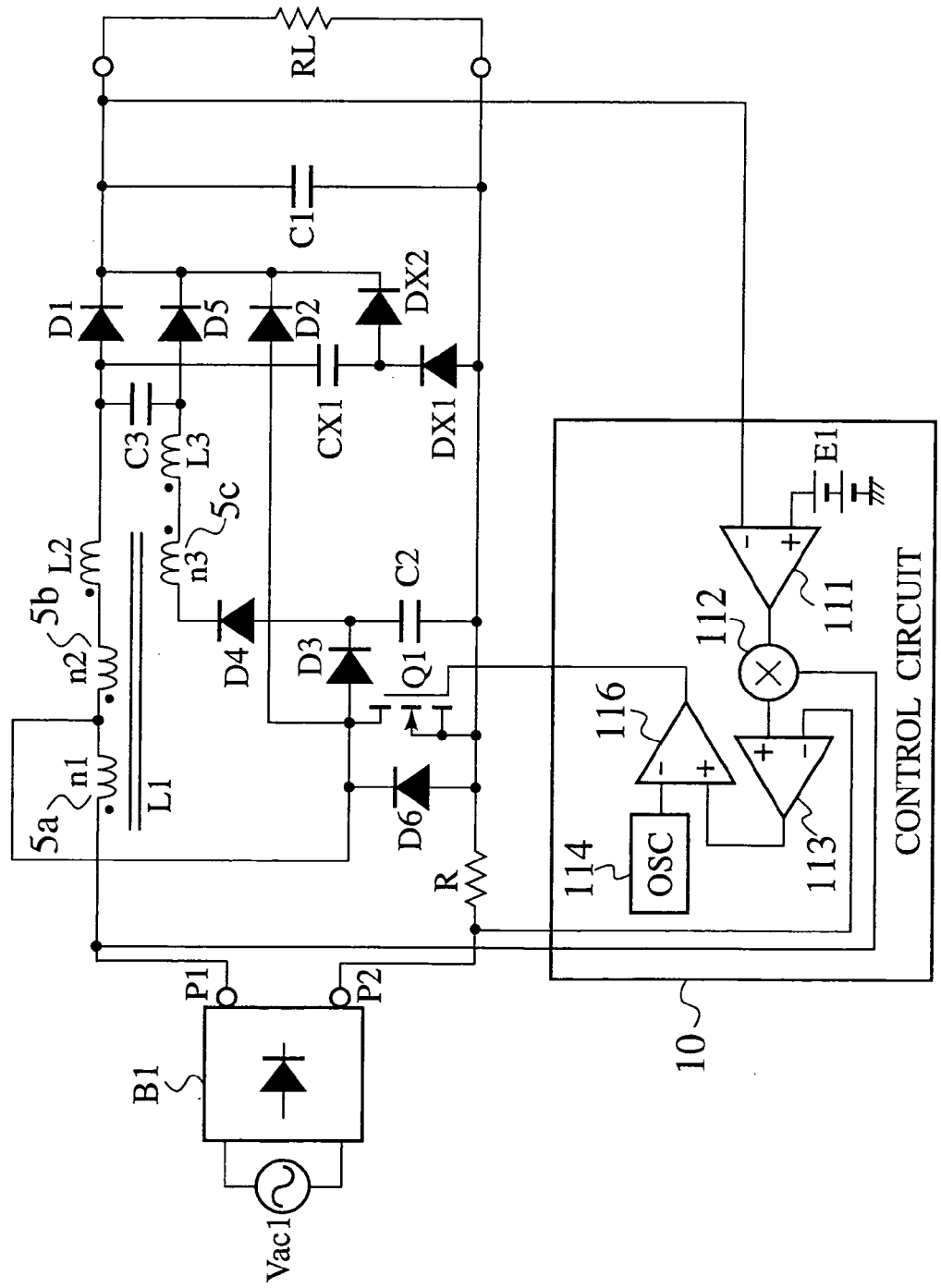
FIG. 18 is a circuit structural view illustrating a modified form of the power is factor correction circuit of the third embodiment.

FIG. 18 is a circuit structural view illustrating a power factor correction circuit of a modified form of the third embodiment. The power factor correction circuit of this modified form features, in addition to the structure of the power factor correction circuit of the third embodiment shown in FIG. 13, to include the capacitor CX1, the diode DX1 and the diode DX2 for reducing losses (i.e., spike current or spike noises resulting from recovery of the diode D1) resulting from diode recovery.

Also, the other structure is identical to the structure of the power factor correction circuit of the third embodiment, shown in FIG. 13, and the same component parts bear like reference numerals to omit description of the same.

Now, operation of the power factor correction circuit, with such a structure, of the modified form of the third embodiment is described below.

As the switch Q1 is turned on, due to the recovery of the diode D1, a current flows in a path expressed as C1→D1→L2→5b→Q1→C1 and this current flow is interrupted upon completion of the recovery cycle of the diode D1. In this moment, a voltage is developed across the ZCS reactor L2 in a direction to cause the diode D1 to be reverse-biased. Due to this voltage, a current flows in a path expressed as L2→5b→Q1→DX1→CX1→L2, permitting electric charge to be stored in the capacitor CX1. When the switch Q1 is turned off, a current flows in a path expressed as Vac1→B1→L1→L2→CX1→DX2→C1→R→B1→Vac1, permitting this electric charge to be circulated to the load RL.

Thus, the power factor correction circuit of the modified form of the third embodiment is able to have, in addition to the advantageous effects of the power factor correction circuit of the third embodiment, a capability of achieving further reduction in losses resulting from diode recovery.

(Fourth Embodiment)

Figure 19:
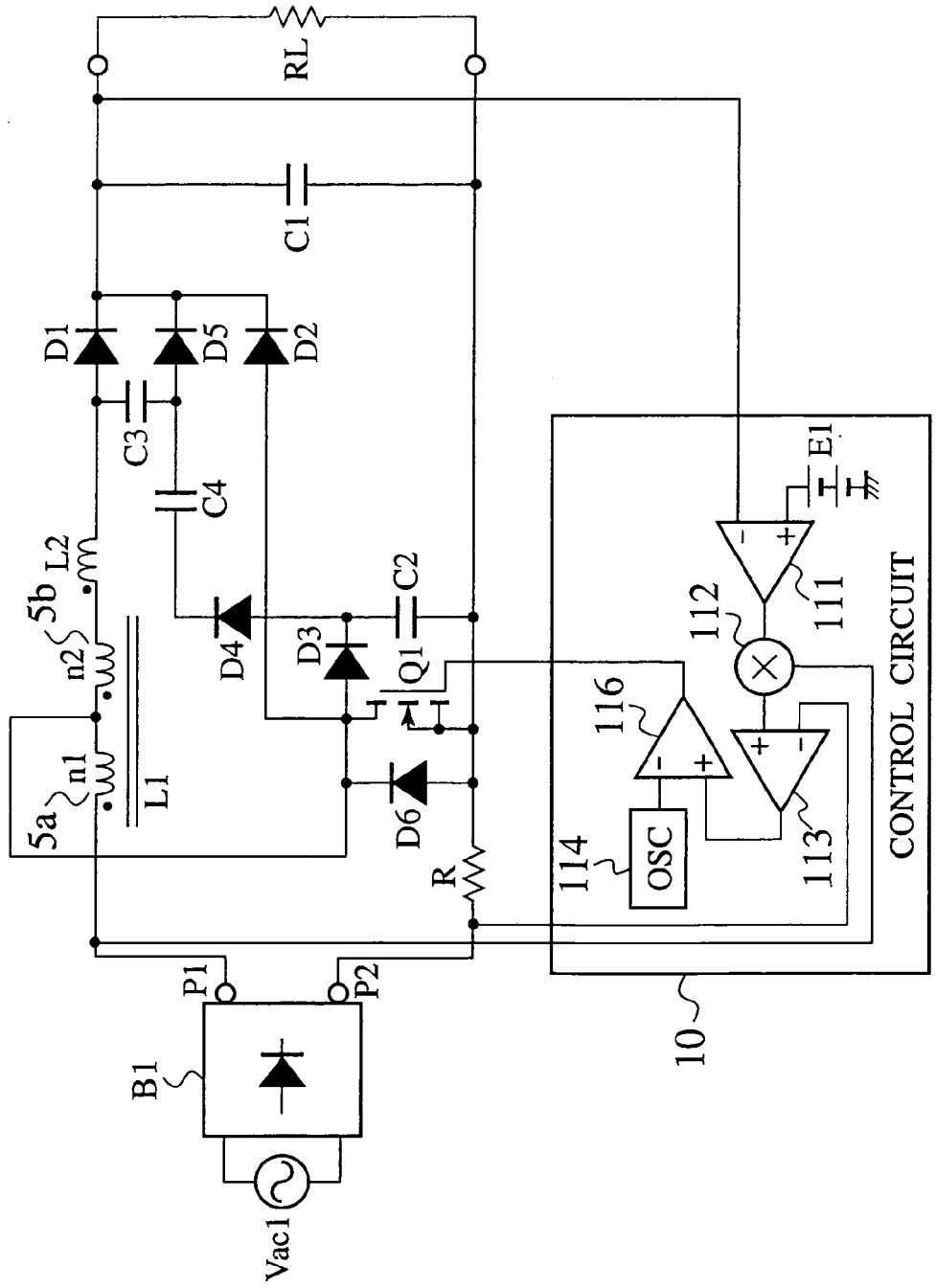
FIG. 19 is a circuit structural view illustrating a power factor correction circuit of a fourth embodiment.

FIG. 19 is a circuit structural view of a power factor correction circuit of a fourth embodiment. The power factor correction circuit of the fourth embodiment, shown in FIG. 19, differs from the power factor correction circuit of the third embodiment, shown in FIG. 13, in that a capacitor C4 is employed in place of the regenerative winding 5c and the current-limiting reactor L3 used in the third embodiment. That is, connected between a junction, between the diode D3 and the snubber capacitor C2, and an anode of the diode D1 is a fourth series circuit that is comprised of a diode D4, a capacitor C4 and the regenerative capacitor C3.

Also, the other structure, shown in FIG. 19, is identical to the structure, shown in FIG. 13, and the same component parts bear like reference numerals to omit detailed description of the same.

The power factor correction circuit, with such a structure, of the fourth embodiment operates on the same timing charts as those shown in FIGS. 15 to 17 described with reference to the power factor correction circuit of the third embodiment. Accordingly, the same advantageous effects as those of the power factor correction circuit of the third embodiment can be obtained.

However, since a discharged current of the capacitor C2 is limited only by the ZCS reactor L2, the peak current increases when the switch Q1 is turned on.

Also, while the fourth embodiment, shown in FIG. 19, further includes, in addition to the structure of the second embodiment, a new structure with the capacitor C4, the regenerative capacitor C3, the diodes D3 to D6 and the snubber capacitor C2, a modified form of the fourth embodiment may additionally include, in addition to the structure of the first embodiment, a new structure added with the capacitor C4, the regenerative capacitor C3, the diodes D3 to D6 and the snubber capacitor C2 to obtain the similar advantageous effects.

Figure 20:
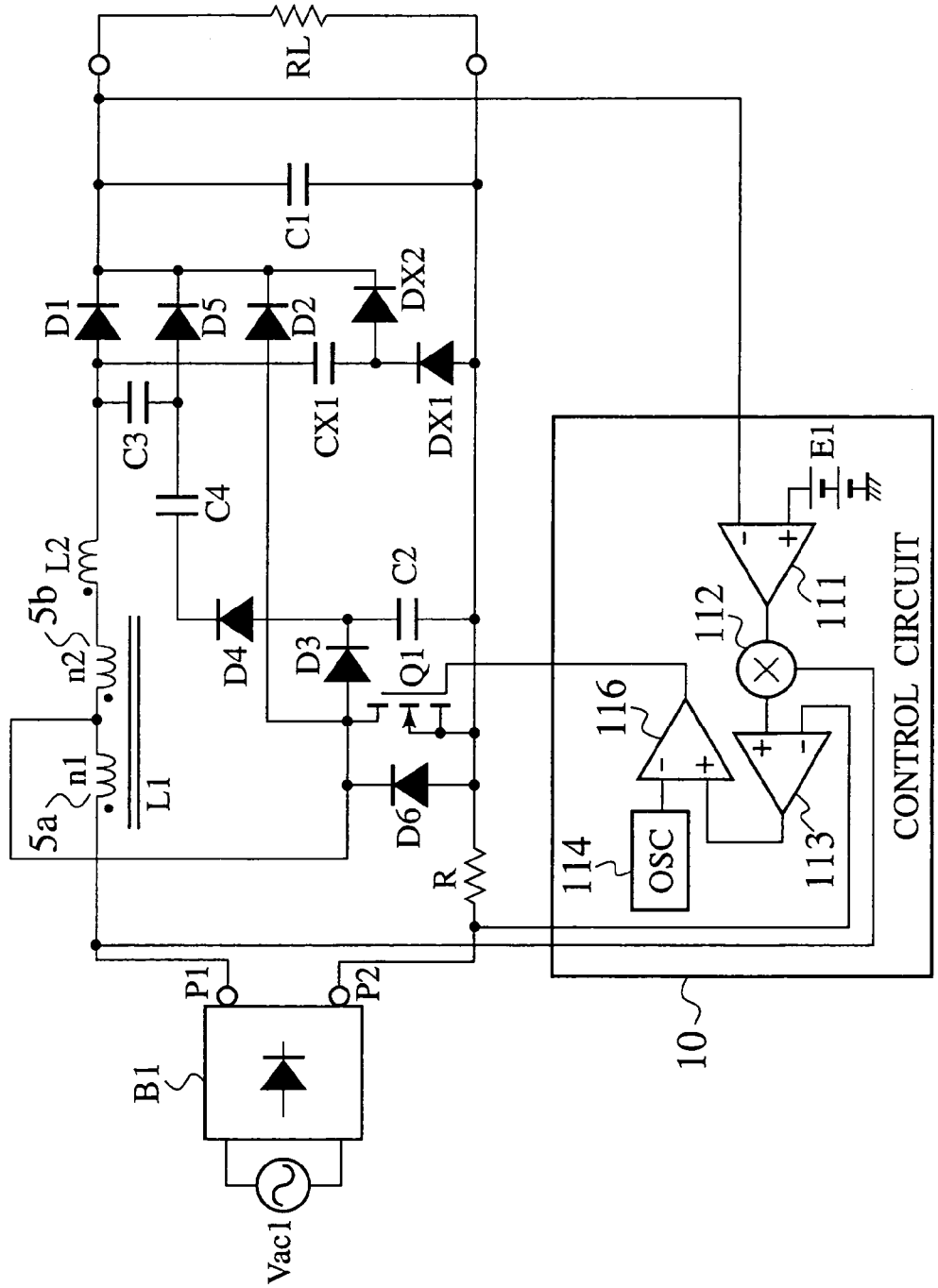
FIG. 20 is a circuit structural view illustrating a modified form of the power factor correction circuit of the fourth embodiment.

FIG. 20 is a circuit structural view illustrating a power factor correction circuit of a modified form of the fourth embodiment. The power factor correction circuit of this modified form features to further include, in addition to the structure of the power factor correction circuit of the fourth embodiment shown in FIG. 19, a new structure added with the capacitor CX1, the diode DX1 and the diode DX2 to achieve reduction in losses (i.e., spike current or spike noises resulting from the recovery of the diode D1) resulting from the diode recovery.

Also, the other structure is identical to the structure of the power factor correction circuit of the fourth embodiment, shown in FIG. 19, and the same component parts bear like reference numerals to omit detailed description of the same.

Next, operation of the power factor correction circuit of the modified form of the fourth embodiment with such a structure is described below.

As the switch Q1 is turned on, due to the recovery of the diode D1, a current flows in a path expressed as C1→D1→L2→5b→Q1→C1 and this current flow is interrupted upon completion of the recovery of the diode D1. In this moment, a voltage is developed across the ZCS reactor L2 in a direction to cause the diode D1 to be reverse-biased. Due to this voltage, a current flows in a path expressed as L2→5b→Q1→DX1→CX1→L2, permitting electric charge to be stored in the capacitor CX1. When the switch Q1 is turned off, a current flows in a path expressed as Vac1→B1→L1→L2→CX1→DX2→C1→R→B1→Vac1, permitting this electric charge to be circulated to the load RL.

Thus, the power factor correction circuit of the modified form of the fourth embodiment is able to have, in addition to the advantageous effects of the power factor correction circuit of the fourth embodiment, a capability of achieving further reduction in losses resulting from the diode recovery.

(Fifth Embodiment)

A power factor correction circuit of a fifth embodiment differs from the power factor correction circuit of the second embodiment in a structure of a control circuit 10a and has a feature in that a switching frequency of a main switch is varied depending on a value of an alternating current power-supply voltage such that the switching frequency is lowered or the switching operation is interrupted when the alternating current power-supply voltage remains at a low level whereby losses in electric power during a low state of the alternating current power-supply voltage is decreased to achieve miniaturization, high efficiency and reduction in low noises.

FIRST EXAMPLE

First Example features that under circumstances where the alternating current power-supply voltage is less than a lower limit preset voltage, the switching frequency of the main switch is set to a lower limit frequency (of, for instance, 20 KHz) and under circumstances where the alternating current power-supply voltage exceeds an upper limit preset voltage, the switching frequency of the main switch is set to an upper limit frequency (of, for instance, 100 KHz) whereby under a situation where the alternating current power-supply voltage varies in a value ranging from the lower limit preset voltage to the upper limit preset voltage, the switching frequency of the main switch is gradually varied in a value ranging from the lower limit frequency to the upper limit frequency.

Figure 21:
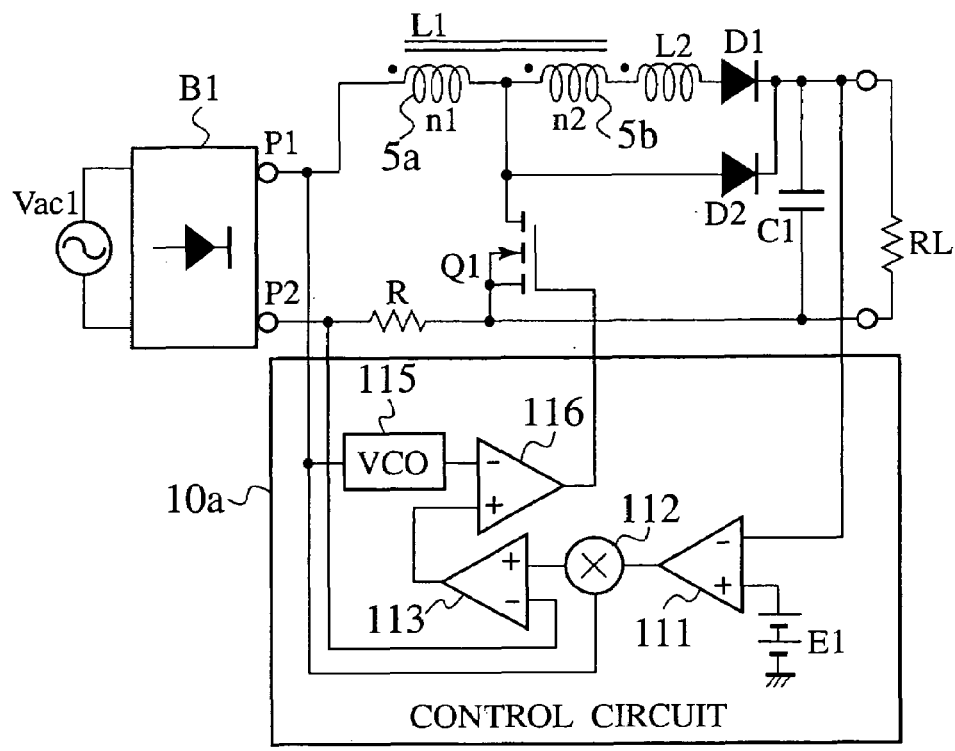
FIG. 21 is a circuit structural view illustrating a first example of a power factor correction circuit of a fifth embodiment.
Figure 22:
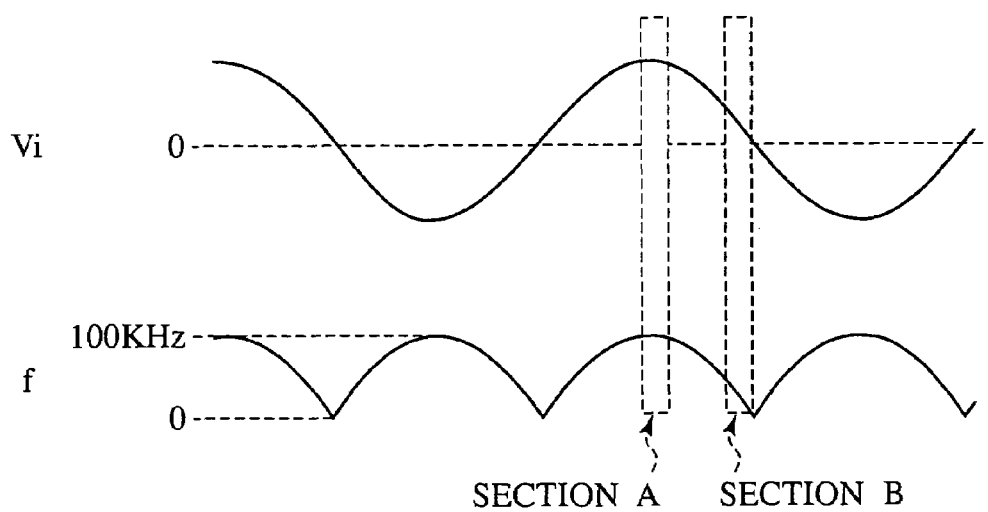
FIG. 22 is a timing chart for an alternating current power-supply voltage waveform and a switching frequency of the first example of the power factor correction circuit of the fifth embodiment.

FIG. 21 is a circuit structural view illustrating first Example of the power factor correction circuit of the fifth embodiment. FIG. 22 is a timing chart for an alternating current power-supply voltage waveform and a switching frequency of first Example of the power factor correction circuit of the fifth embodiment. FIG. 22 shows a situation wherein under circumstances where the alternating current voltage Vi varies from zero to the maximum value, the switching frequency f of the switch Q1 varies from zero to a value of, for instance, 100 KHz.

Figure 23:
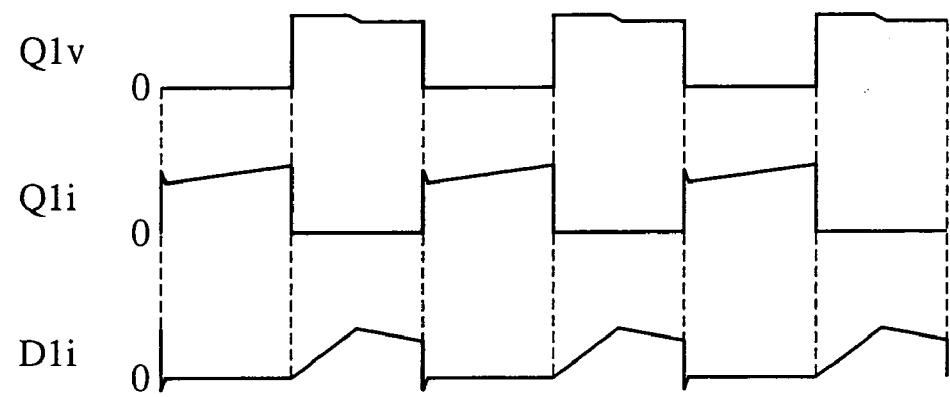
FIG. 23 is a view illustrating a switching waveform of a section A of the timing chart shown in FIG. 22 at a frequency of 100 KHz.
Figure 24:
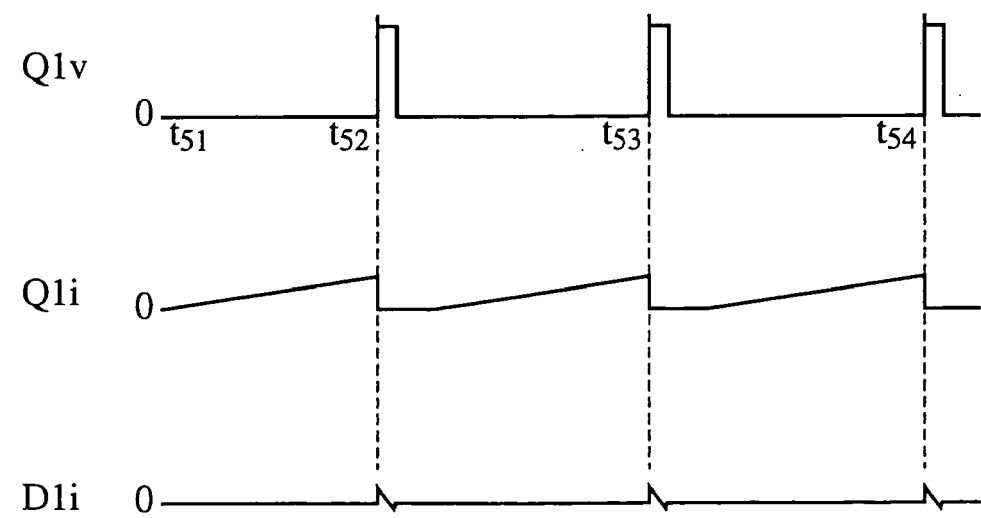
FIG. 24 is a view illustrating a switching waveform of a section B of the timing chart shown in FIG. 22 at a frequency of 20 KHz.

FIG. 23 shows switching waveforms at a frequency of 100 KHz at a section A (a section in which the alternating current power-supply voltage Vi remains at a value in the vicinity of the maximum value) of the timing chart shown in FIG. 22. The timing chart, shown in FIG. 23, represents that the switching frequency f lies at a frequency of 100 KHz and identical to the timing chart of FIG. 5. FIG. 24 shows switching waveforms at a frequency of 20 KHz at a section B (a section in which the alternating current voltage Vi remains at a low value) of the timing chart shown in FIG. 22.

Also, the other structure, shown in FIG. 21, is identical to the structure shown in FIG. 10 and the same component parts bear like reference numerals to omit detailed description of the same.

The control circuit 10a is configured in a structure that is comprised of an error amplifier 111, a multiplier 112, an error amplifier 113, a voltage-controlled oscillator (VCO) 115 and a PWM comparator 116. Also, the error amplifier 111, the multiplier 112, the error amplifier 113, the voltage-controlled oscillator (VCO) 115 and the PWM comparator 116 are identical to those shown in FIG. 10, respectively, and detailed description of the same is herein omitted.

The VCO 115 (which corresponds to a frequency control means of the present invention) serves to generate a ramp signal (which corresponds to a frequency control signal of the present invention) by which the switching frequency f of the switch Q1 is varied depending on a voltage value of a full-wave rectified voltage delivered from the full-wave rectifying circuit B1 and has a voltage frequency conversion characteristic in which the switching frequency f of the switch Q1 increases with an increase in the full-wave rectified voltage delivered from the full-wave rectifying circuit B1.

Figure 25:
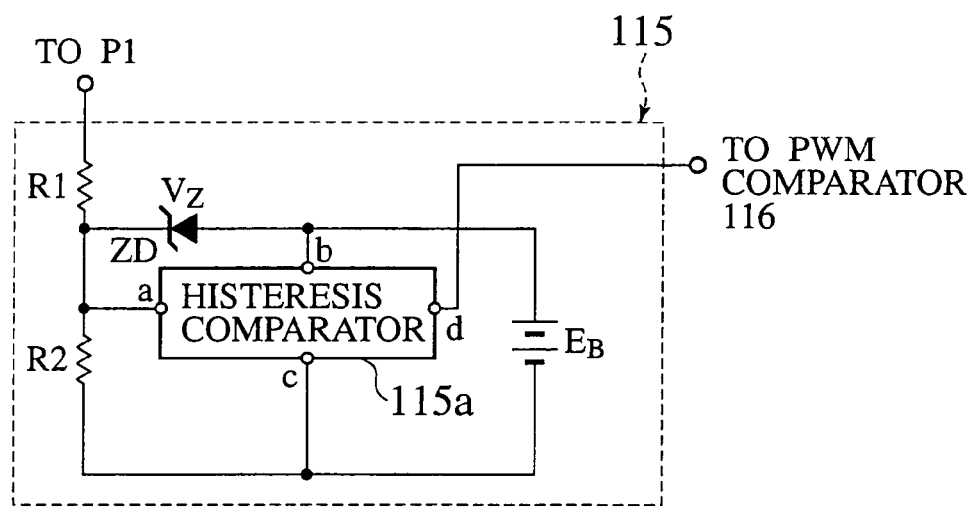
FIG. 25 is a detailed circuit structural view of a VCO provided in the first example of the power factor correction circuit of the fifth embodiment.

FIG. 25 is a detailed circuit structural view of the VCO provided in first Example of the power factor correction circuit of the fifth embodiment. In the VCO 115, connected to the positive electrode terminal P1 of the full-wave rectifying circuit B1 is a resistor R1 to which a resistor R2 is connected in series. Connected to a junction between the resistors R1 and R2 is a cathode of a Zener diode ZD whose anode is connected to a positive electrode of a control power-supply EB and a power-supply terminal b of a hysteresis comparator 115a. Connected to the junction between the resistors R1 and R2 is an input terminal a of the hysteresis comparator 115a whose ground terminal c is connected to a negative electrode of the control power-supply EB and the other end of the resistor R2. An output terminal d of the hysteresis comparator 115a is connected to one end of the PWM comparator 116. The hysteresis comparator 115a generates the ramp signal that has a voltage frequency conversion characteristic CV in which the switching frequency f increases with an increase in the voltage Ea applied to the input terminal as shown in FIG. 27.

With the VCO 115 shown in FIG. 25, since the Zener diode ZD yields when the alternating current power-supply voltage Vi, shown in FIG. 22, reaches a value (at the section A) close proximity to the maximum voltage value, the voltage Ea, to be applied to the input terminal a, is set to a value of a total voltage (VZ+EB), of a yield voltage VZ of the Zener diode ZD and the control power-supply voltage EB, i.e., the upper limit preset value. Also, when the alternating current power-supply voltage Vi reaches the low area (section B), a current flows from the control power-supply EB to the resistor R2 via the Zener diode ZD. The voltage Ea, to be applied to the input terminal a, is set to the control power-supply voltage EB, i.e., the lower limit preset value. Additionally, under situations where the alternating current power-supply voltage Vi lies in ranges up to the value close proximity to the maximum value and the value close proximity to the low level, the voltage Ea, to be applied to the input terminal a, varies within a range between the value of the total voltage (VZ+EB) and the control power-supply voltage EB.

Figure 27:
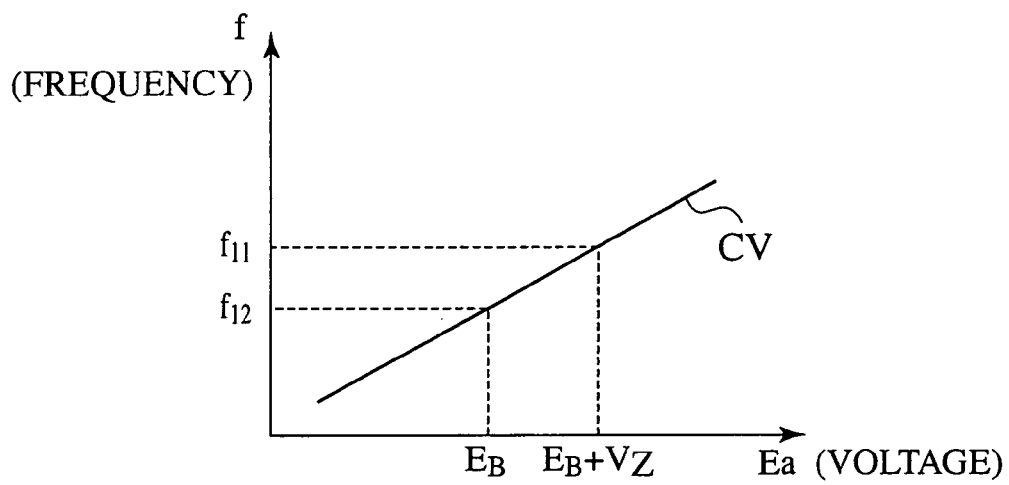
FIG. 27 is a view illustrating a characteristic of a VCO of the first example of the power factor correction circuit of the fifth embodiment.

For this reason, as shown in FIG. 27, the switching frequency f of the switch Q1 is set to the lower limit frequency f12 (of, for instance, 20 KHz) under circumstances where the alternating current power-supply voltage Vi remains less than the lower limit preset voltage EB; the switching frequency f of the switch Q1 is set to the upper limit frequency f11 (of, for instance, 100 KHz) under circumstances where the alternating current power-supply voltage Vi remains greater than the upper limit preset voltage (VZ+EB); and the switching frequency f of the switch Q1 gradually varies from the lower limit frequency f12 to the upper limit frequency f11.

Figure 28:
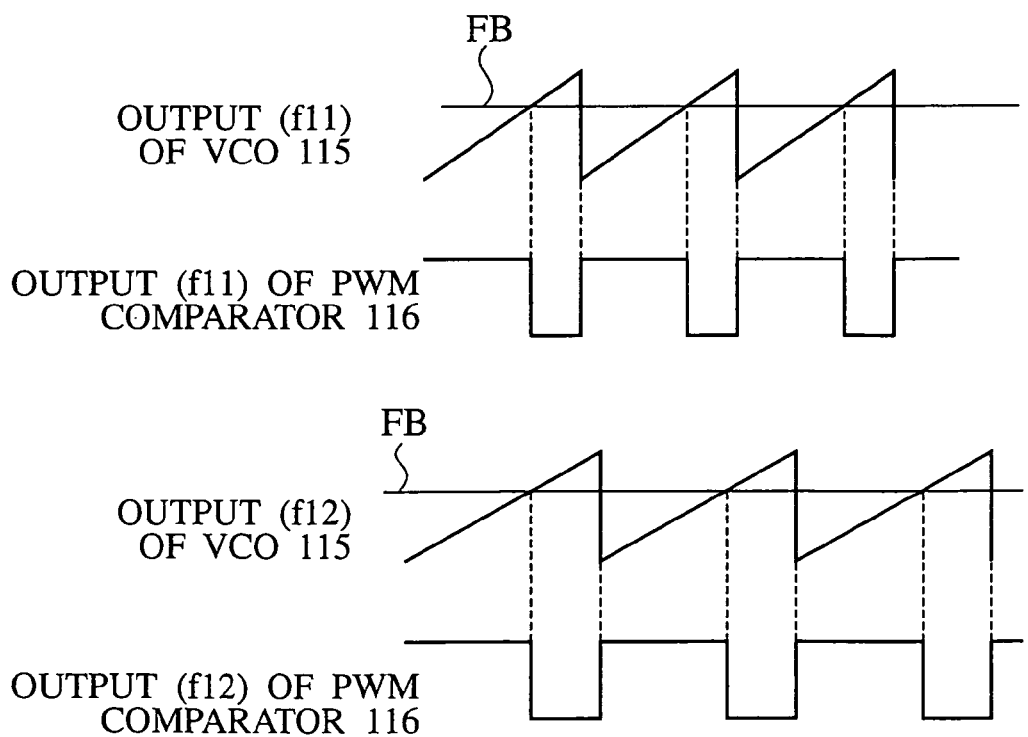
FIG. 28 is a view illustrating an appearance in which a pulse frequency of a PWM comparator varies depending on the variation in the frequency of the VCO of the first example of the power factor correction circuit of the fifth embodiment.

The PWM comparator 116 (which corresponds to a pulse width control means of the present invention) operates such that the ramp signal is applied to a minus terminal from the VCO 115 and a feedback signal FB is applied to a positive terminal of the error amplifier 113 whereupon, as shown in FIG. 28, the PWM comparator 116 generates a pulse signal that allows the switch Q1 to turn on when the feedback signal exceeds the ramp signal and a pulse signal that allows the switch Q1 to turn off when the feedback signal is less than the ramp signal. These pulse signals are applied to the switch Q1 to allow the smoothing capacitor C1 to regulate an output voltage of the smoothing capacitor C1 to a given voltage.

Further, with the output voltage of the smoothing capacitor C1 reached a reference voltage E1 to cause a drop in the feedback signal FB, the PWM comparator 16 shortens a pulse-on width in which a value of the feedback signal FB exceeds the value of the ramp signal, thereby controlling the output voltage to a given voltage. That is, the pulse width is controlled.

Also, the maximum value and the minimum value of the voltage of the ramp signal, delivered from the VOC 115, do not vary due to the frequency. Therefore, an ON/OFF duty ratio of a pulse signal is determined due to the feedback signal FB of the error amplifier 113 regardless of the frequency. Also, even if the ON/OFF duty ratio of the pulse signal varies due to variation in the switching frequency f, no variation takes place in the ON/OFF duty ratio of the pulse signal.

Now, operation of first Example of the power factor correction circuit of the fifth embodiment with such a structure is described below with reference to FIGS. 22 to 28. Here, only the operation of the control circuit 10a is described.

First, the error amplifier 111 amplifies an error between a voltage of the smoothing capacitor C1 and a reference voltage E1 to produce an error voltage signal, which is outputted to the multiplier 112. The multiplier 112 multiplies the error voltage signal from the error amplifier 111 and the full-wave rectified voltage from the output terminal on the positive electrode side of the full-wave rectifier circuit B1 to output a multiplied output voltage to a "+" terminal of the error amplifier 113.

Then, the error amplifier 113 amplifies an error between a voltage of the current detection resistor R (which corresponds to a current detection means of the present invention) and the multiplied output voltage to generate an error voltage signal, which is outputted to the PWM comparator 116 as a feedback signal FB.

In the meanwhile, the VCO 115 generates a ramp signal that varies the switching frequency f of the switch Q1 depending on the voltage value of the full-wave rectified voltage from the full-wave rectifier circuit B1.

Figure 26:
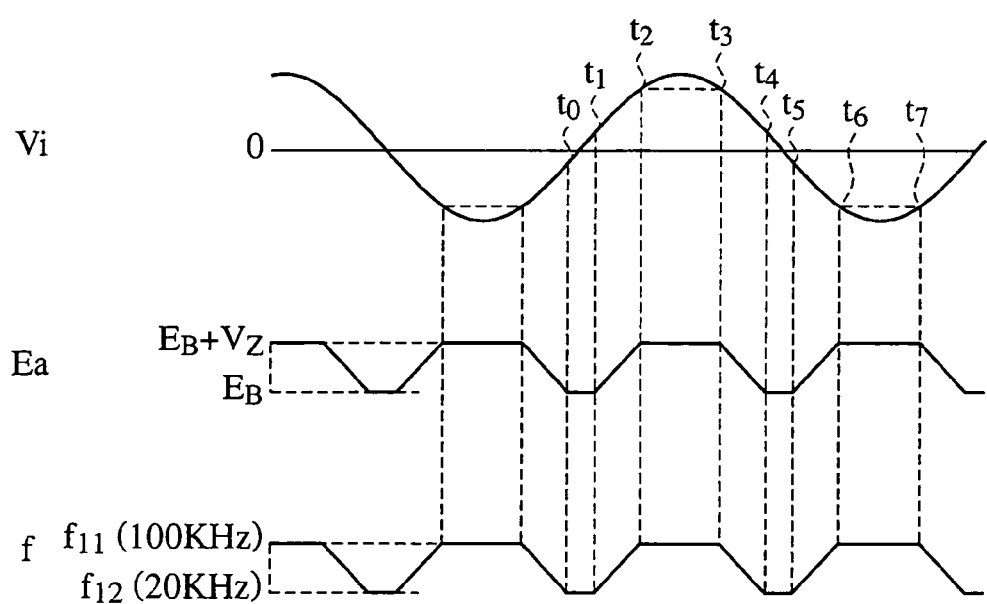
FIG. 26 is a timing chart for an alternating current power-supply voltage waveform, a voltage inputted to a hysteresis comparator, and a switching frequency, which varies depending on this voltage, in the first example of the power factor correction circuit of the fifth embodiment.

Here, describing the signals with reference to the timing chart of FIG. 26, when the alternating current power-supply voltage reaches an area in the vicinity of the maximum value (for instance, at times t2 to t3 and times t6 to t7), the Zener diode ZD shown in FIG. 25 yields. In this moment, the voltage Ea, to be applied to the input terminal a, is set to a total voltage (VZ+EB), of the yield voltage VZ of the Zener diode ZD and the control power-supply voltage EB, that is, the upper limit preset voltage. Therefore, when the alternating current power-supply voltage Vi exceeds the upper limit preset voltage (VZ+EB), the VCO 115 allows the switching frequency f of the switch Q1 to be set to the upper limit frequency f11 (of, for instance, 100 KHz).

Next, when the alternating current power-supply voltage Vi reaches a low level (for instance, at times t0 to t1 and times t4 to t5), a current flows through the resistor R2 from the control power-supply EV, shown in FIG. 25, via the Zener diode ZD. Then, the voltage Ea, to be applied to the input terminal a, is set to the control power-supply voltage EB, that is, the lower limit preset voltage. Therefore, if the alternating current power-supply voltage Vi is less than the lower limit preset voltage EB, the VOC 115 allows the switching frequency f of the switch Q1 to be set to the lower limit frequency f12 (of, for instance, 20 KHz).

Further, if the alternating current power-supply voltage Vi remains in a range between the proximities of the maximum value and the low level area (for instance, at times t1 to t2, times t3 to t4 and times t5 to t6), the voltage Ea, to be applied to the input terminal a, gradually varies in a range between the total voltage (VZ+EB) and the control power-supply voltage EB. Therefore, if the alternating current power-supply voltage Vi remains in a value ranging from the lower limit preset voltage EB to the upper limit preset voltage (VZ+EB), the switching frequency f of the switch Q1 gradually varies from the lower limit frequency f12 to the upper limit frequency f11.

On the contrary, if the alternating current power-supply voltage Vi remains in the area close proximity to the maximum value (for instance, at times t2 to t3 and times t6 to t7), the PWM comparator 116 generates a pulse signal, at the lower limit frequency f12, which lies at an "ON" state when the value of the feedback signal FB is greater than the value of the ramp signal of the lower limit frequency f12 and an "OFF" state when the value of the feedback signal FB is less than the value of the ramp signal of the lower limit frequency f12, as shown in FIG. 28, and which is applied to the switch Q1.

In the meantime, if the alternating current power-supply voltage Vi reaches the low area (for instance, at times t0 to t1 and times t4 to t5), the PWM comparator 116 generates a pulse signal, which lies at an "ON" state when the value of the feedback signal FB is greater than the value of the ramp signal of the lower limit frequency f12 and an "OFF" state when the value of the feedback signal FB is less than the value of the ramp signal of the lower limit frequency f12, as shown in FIG. 28, and which is applied to the switch Q1.

Further, if the alternating current power-supply voltage Vi remains in a range between the proximities of the maximum value and the low level area (for instance, at times t1 to t2, times t3 to t4 and times t5 to t6), the PWM comparator 116 generates a pulse signal, at a frequency that gradually varies in a value ranging from the lower limit frequency f12 to the upper limit frequency f11, which is applied to the switch Q1.

Thus, with first Example, the advantageous effect of the power factor correction circuit of the second embodiment is obtained. Further, the switching frequency f of the switch Q1 is allowed to vary depending on the alternating current power-supply voltage Vi such that the switching frequency f is lowered at the low level area of the alternating current power-supply voltage and, as shown in FIG. 24, a time period in which the switch Q1 is turned on increases for thereby increasing a current to enable electric power to be supplied to the load RL. Also, the number of switching cycles decreases, enabling reduction in switching losses.

Particularly, the switching frequency f of the switch Q1 is set to the upper limit frequency of a value of, for instance, 100 KHz and the lower limit frequency of, for instance, 20 KHz, which is non-audible for human beings, and has the other area whose switching frequency f is made proportionate to the alternating current power-supply voltage Vi. This enables reduction in switching losses and, also, the switching frequency lies in a value less than the non-audible frequency with no occurrence of discomfort noises.

Further, even in the presence of the switching frequency with one area laying at the maximum frequency when the alternating current power-supply voltage Vi lies at the maximum value (with the maximum current) and the other area varying in proportion to the alternating current power-supply voltage Vi, no magnetic flux of the booster reactor L1 exceeds the maximum value and the booster reactor L1 is not largely sized in structure, enabling reduction switching losses.

Furthermore, the switching frequency of the switch Q1 straddles in a value ranging from the lower limit frequency to the upper limit frequency and, hence, noises occur in dispersed patterns with respect to the frequency, enabling reduction in noises. Thus, a power factor correction circuit with miniaturization, high efficiency and low noises can be provided.

SECOND EXAMPLE

Figure 29:
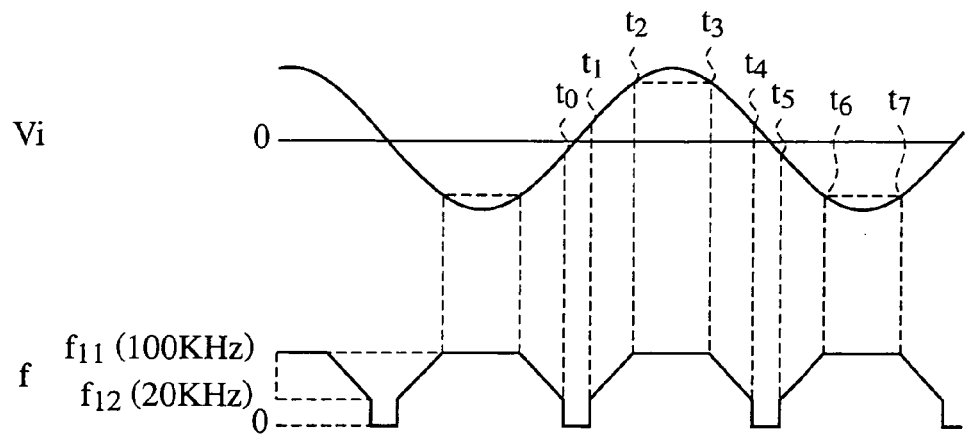
FIG. 29 is a timing chart for a switching frequency that varies depending on an alternating current power-supply voltage waveform, of a second example of the power factor correction circuit of the fifth embodiment, and a voltage to be inputted to the hysteresis comparator.

FIG. 29 is a timing chart of a switching frequency that varies depending on the alternating current power-supply voltage and the VCO in second Example of the power factor correction circuit of the fifth embodiment.

While the first Example, shown in FIG. 26, has been described with reference to an exemplary case where the VCO 115 allows the switching frequency f of the switch Q1 to be set to the lower limit frequency f12 (of, for instance, 20 KHz), second Examples, shown in FIG. 29, features that under circumstances where the alternating current power-supply voltage Vi remains in a lower level and the switching frequency lies in a value less than the lower limit frequency f12, the VCO 115 stops the operation of the main switch Q1. Under such a stopped condition, an input current is minimum, thereby suppressing the distortion of the alternating current power-supply voltage waveform to a minimal level.

THIRD EXAMPLE

The third Example features that under circumstances where the alternating current power-supply voltage lies in a value less than the preset voltage, the switching frequency of the main switch is set to the lower limit frequency (of, for instance, 20 KHz) whereas when the alternating current power-supply voltage exceeds the preset voltage, the switching frequency of the main switch is set to the upper limit frequency (of, for instance, 100 KHz).

Figure 30:
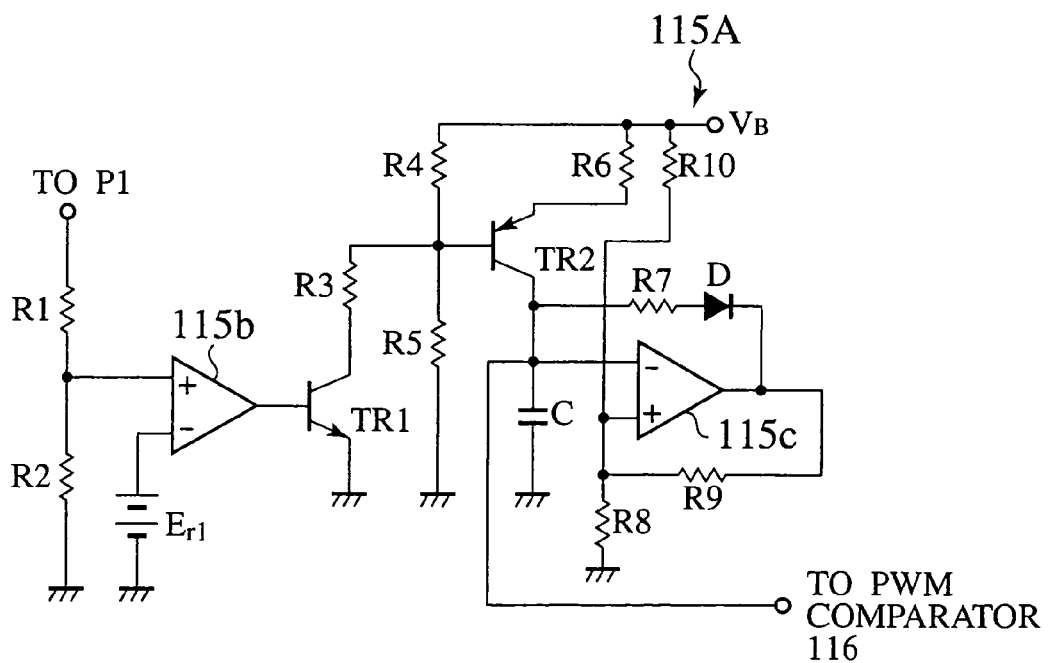
FIG. 30 is a detailed circuit structural view of a VCO provided in a third example of the power factor correction circuit of the fifth embodiment.

FIG. 30 is a detailed circuit structural view of the VCO of third Example of the power factor correction circuit of the fifth embodiment. In the VCO 115 shown in FIG. 30, the resistor R1 is connected to the output terminal P1 on the positive electrode side of the full-wave rectifier circuit B1, and the resistor R2 is connected to the resistor R1 in series. A comparator 115b has a "+" terminal, which is applied with a voltage at a junction between the resistors R1 and R2, and a "−" terminal applied with a reference voltage Er1, whereby when the voltage at the junction between the resistors R1 and R2 is greater than the reference voltage Er1, the comparator 115b outputs a signal with "H" level to a base of a transistor TR1. In this case, the reference voltage Er1 is set to the preset voltage set forth above.

The transistor TR1 has an emitter connected to the ground and a collector connected through a resistor R3 to a junction, between one end of a resistor R4 and one end of a resistor R5, to which a base of a transistor TR2 is also connected. The other end of the resistor R4 is connected to a power-supply VB and the other end of the resistor R5 is connected to the ground. The transistor TR2 has an emitter connected through a resistor R6 to the power-supply VB and a collector connected through a capacitor C to the ground.

To allow the comparator 115c to have a hysteresis, a resistor R9 is connected between a "+" terminal and an output terminal, while the "+" terminal is connected to the ground through a resistor R8 and connected to the power-supply VB through a resistor R10.

Figure 31:
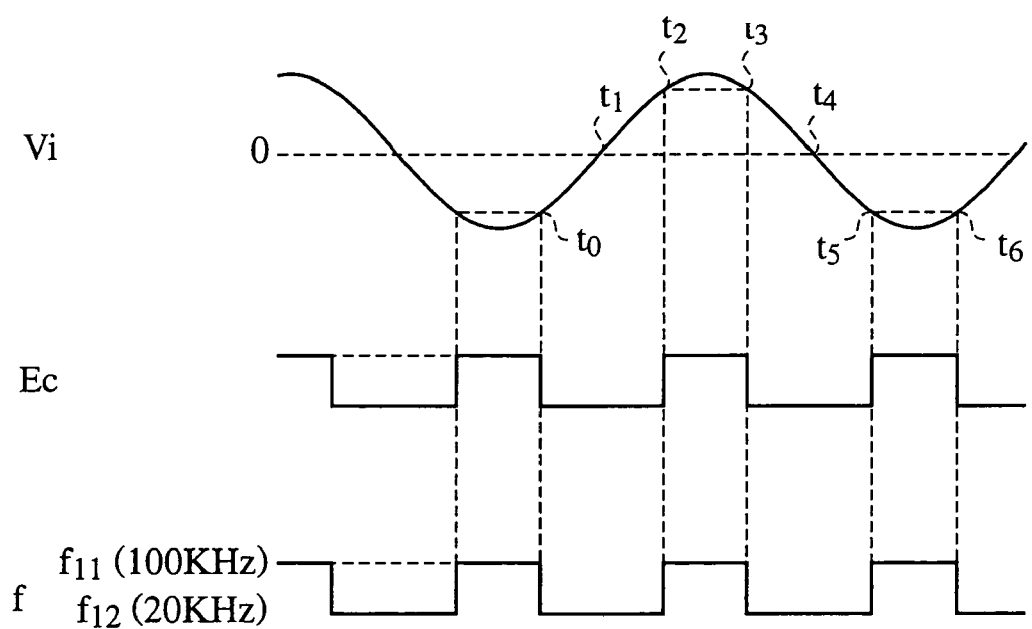
FIG. 31 is a timing chart for an alternating current power-supply voltage waveform, an output voltage of a capacitor, and a switching frequency, which varies depending on such a voltage, in the third example of the power factor correction circuit of the fifth embodiment.

The terminal of the comparator 115c is applied with a voltage of the capacitor C and connected to the output terminal of the comparator 115c through a series circuit composed of the diode D and the resistor 7. As shown in FIG. 31, if the alternating current power-supply voltage Vi is less than the preset voltage, the comparator 115c generates a ramp signal by which the switching frequency f of the switch Q1 is set to the lower limit frequency f12 and a ramp signal by which the switching frequency f of the switch Q1 is set to the upper limit frequency f11.

Now, operation of third Example of the power factor correction circuit of the fifth embodiment with such a structure is described with reference to FIGS. 30 and 31. Here, the description is made of only the operation of the VCO 115A.

First, the VCO 115A generates a ramp signal by which the switching frequency f of the switch Q1 varies depending on a voltage value of the full-wave rectified voltage from the full-wave rectifying circuit B1.

Here, making description with reference to the timing chart of FIG. 31, if the alternating current power-supply voltage Vi exceeds the preset voltage (for instance, at times t2 to t3 and times t5 to t6), the transistor TR1 is turned on due to the "H" level signal from the comparator 115b. Therefore, a current flows from the power-supply VB to the resistor R3 via the resistor R4 and a base of the transistor TR2, thereby increasing a collector current flowing through a collector of the transistor TR2. Then, the capacitor C is charged in a short period of time due to the current flowing through the collector of the transistor TR2. That is, the voltage Ec of the capacitor C increases to allow this voltage Ec to be inputted to the comparator 115c, which in turn generates a ramp signal by which the switching frequency f of the switch Q1 is set to the upper limit frequency f11 (of, for instance, 100 KHz).

On the contrary, if the alternating current power-supply voltage Vi is less than the preset voltage (for instance, at times t0 to t2 and times t3 to t5), the comparator 115b does not generate the "H" level signal and the transistor TR1 is turned off. Therefore, the collector current of the transistor TR2 decreases, causing the capacitor C to be charged in an elongated time period. That is, the voltage Ec of the capacitor C gradually rises to allow this voltage Ec to be applied to the comparator 115c. In this moment, the comparator 115c generates a ramp signal by which the switching frequency f of the switch Q1 is set to the lower limit frequency f12 (of, for instance, 20 KHz).

Next, if the alternating current power-supply voltage Vi exceeds the preset voltage (for instance, at times t2 to t3 and times t5 to t6), the PWM comparator 116 generates a pulse signal, which lies at an "ON" state when the value of the feedback signal FB is greater than the value of the ramp signal at the upper limit frequency f11 and an "OFF" state when the value of the feedback signal FB is less than the value of the ramp signal at the upper limit frequency f11, and which is applied to the switch Q1.

On the contrary, if the alternating current power-supply voltage Vi is less than the preset voltage (for instance, at times t0 to t2 and times t3 to t5), the PWM comparator 116 generates a pulse signal, which lies at an "ON" state when the value of the feedback signal FB is greater than the value of the ramp signal at the lower limit frequency f12 and an "OFF" state when the value of the feedback signal FB is less than the value of the ramp signal at the lower limit frequency f12, and which is applied to the switch Q1.

Thus, with third Example, even when the power factor correction circuit operates such that under circumstances where the alternating current power-supply voltage Vi is less than the preset voltage, the switching frequency of the switch Q1 is set to the lower limit frequency whereas under circumstances where the alternating current power-supply voltage Vi exceeds the preset voltage, the switching frequency of the switch Q1 is set to the upper limit frequency, thereby obtaining substantially the same advantageous effects as those of first Example.

Also, while the fifth embodiment corresponds to the power factor correction circuit in which the control circuit 10 of the second embodiment is replaced with the control circuit 10a, the present invention may be applied, as a first modification of the fifth embodiment, to a power factor correction circuit in which the control circuit 10 of the first embodiment is replaced with the control circuit 10a. Also, the present invention may be further applied, as a second modification of the fifth embodiment, to a power factor correction circuit in which the control circuit 10 of the third embodiment is replaced with the control circuit 10a.

OTHER EXAMPLE

Figure 32:
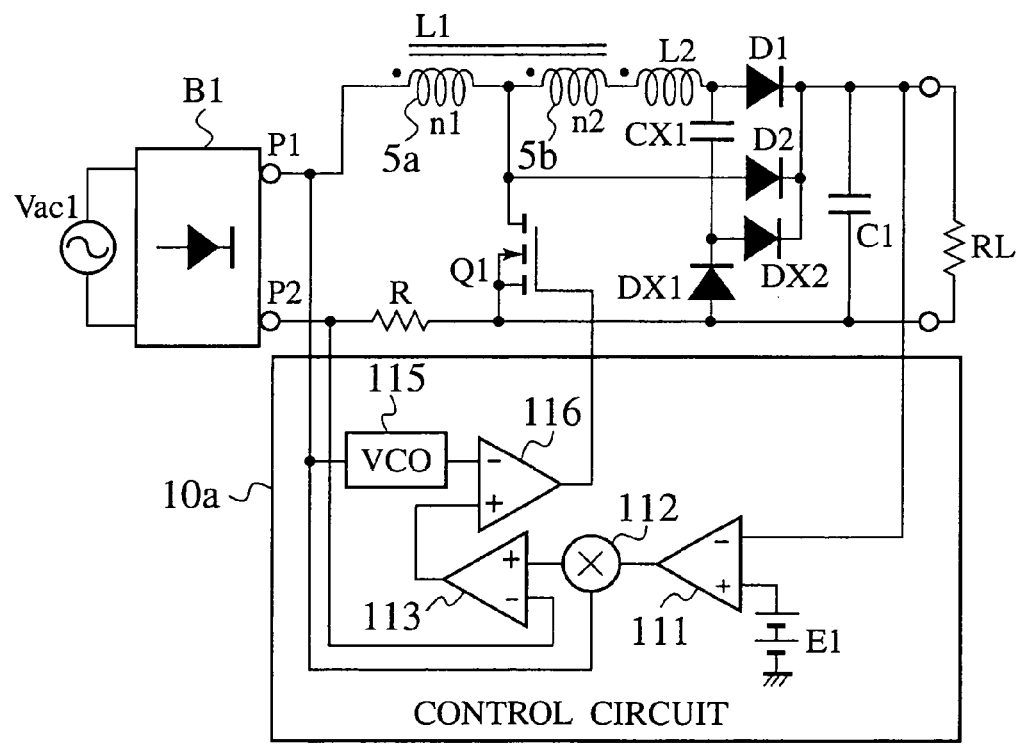
FIG. 32 is a circuit structural view illustrating the other example of the power factor correction circuit of the fifth embodiment.

FIG. 32 is a circuit structural view illustrating the other Example of the power factor correction circuit of the fifth embodiment. The power factor correction circuit of this Example, shown in FIG. 32, features to additionally include, in addition to the structure of the power factor correction circuit of the fifth embodiment, shown in FIG. 21, the capacitor CX1, the diode DX1 and the diode DX2 to achieve reduction in losses (that is, spike current, which would occur during the recovery of the diode D1, and spike noises) resulting from the recovery of the diode.

Also, the other structure is identical to the structure of the power factor correction circuit of the fifth embodiment, shown in FIG. 21, and the same component parts bear like reference numerals to omit description of the same.

Now, description is made of the operation of the power factor correction circuit of the other Example of the fifth embodiment with such a structure.

As the switch Q1 is turned on, due to the recovery of the diode D1, a current flows in a path expressed as C1→D1→L2→5b→Q1→C1 and this current flow is interrupted upon completion of the recovery cycle of the diode D1. In this moment, a voltage is developed across the ZCS reactor L2 so as to allow the diode D1 to be reverse-biased. Due to this voltage, a current flows in a path expressed as L2→5b→Q1→DX1→CX1→L2, permitting electric charge to be stored in the capacitor CX1. When the switch Q1 is turned off, a current flows in a path expressed as Vac1→B1→L1→L2→CX1→DX2→C1→R→B1→Vac1, permitting this electric charge to be circulated to the load RL.

Thus, the power factor correction circuit of the other Example of the power factor correction circuit of the fifth embodiment is able to have, in addition to the advantageous effects of the power factor correction circuit of the fifth embodiment, a capability of achieving further reduction in losses resulting from the recovery of the diode.

(Sixth Embodiment)

Next, a power factor correction circuit of a sixth embodiment is described. In the power factor correction circuits of the first to fifth embodiments, the main switch has been described as including the normally turned off type MOS FET.

This normally turned off type MOS FET is a switch that remains in an off state when the power-supply is turned off.

On the contrary, a normally turned on type switch, such as SIT (static induction transistor), is a switch that remains in a turned-on state when the power-supply is turned off. The normally turned on type switch has a high switching speed with low turning-on resistance to be idealistic element when used as an electric power conversion device, such as a switching power-supply, and is highly expected to have high efficiency with less switching losses.

However, since the normally turned on type switch element remains in the turned-on state when the power-supply is turned on, this switch is short-circuited. Therefore, the normally turned on type switch cannot be started up and cannot be used in applications except for specific applications.

To address such an issue, the power factor correction circuit of the sixth embodiment has a feature to include a structure of the second embodiment and, in addition to this structure, a structure wherein with a view to using the normally turned on type witch as the switch Q1, a voltage caused by a voltage drop in a rush current limiting resistor, inserted for the purpose of eliminating a rush current of a capacitor occurring when the alternating current power-supply is turned on, is used for causing the normally turned on type switch to be reverse-biased for thereby addressing the issue caused when turning on the power-supply.

Figure 33:
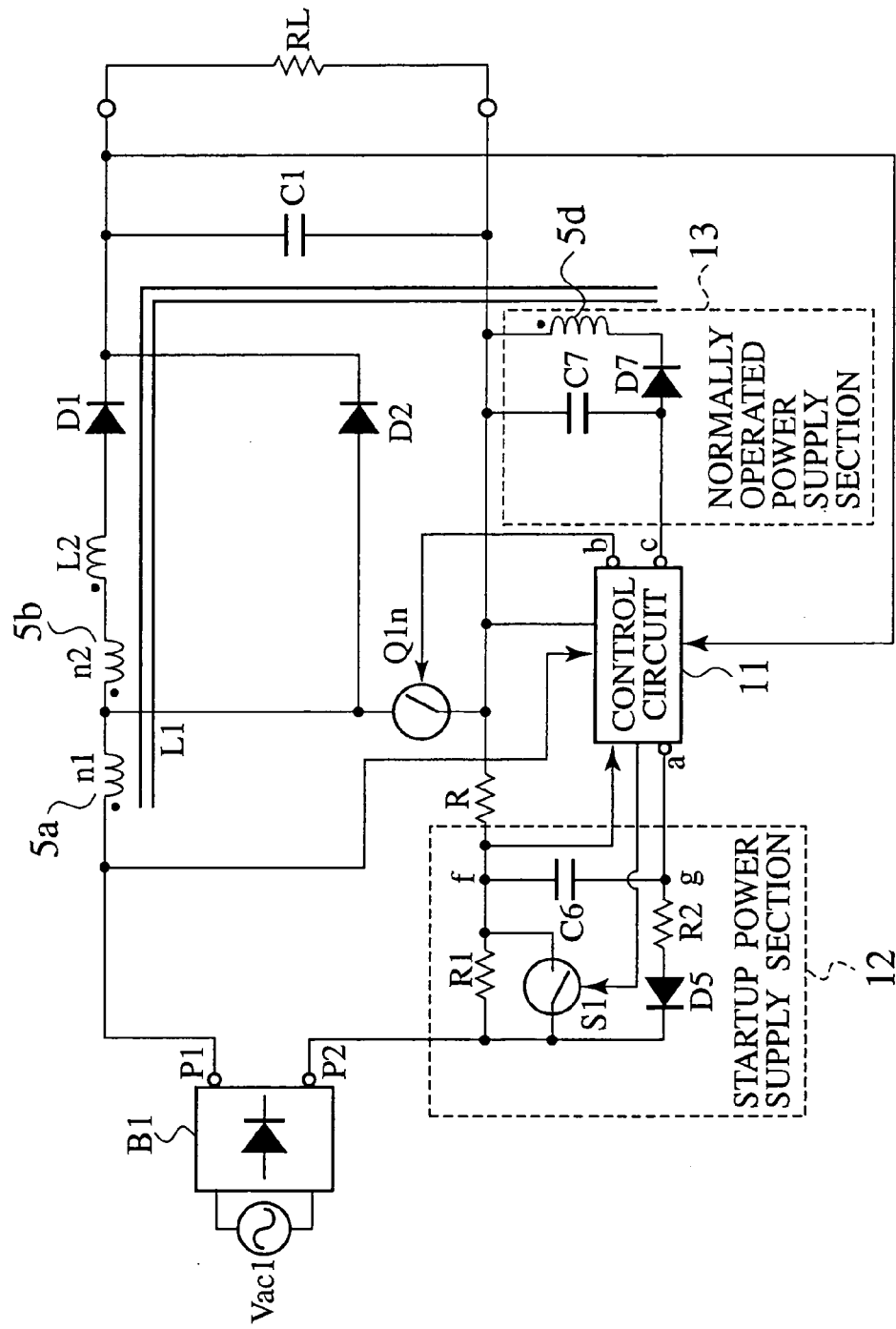
FIG. 33 is a circuit structural view illustrating a power factor correction circuit of a sixth embodiment.

FIG. 33 is a circuit structural view illustrating the power factor correction circuit of the sixth embodiment. The power factor correction circuit, shown in FIG. 33, has the same structure as the power factor correction circuit of the second embodiment, shown in FIG. 10, and is arranged such that the alternating current power-supply voltage, inputted from the alternating current power-supply Vac1, is rectified by the full-wave rectifying circuit B1 to allow the resulting voltage to be converted to a direct current voltage to be outputted and, to this end, a rush current limiting resistor R1 is connected between the negative electrode side output terminal P2 of the full-wave rectifying circuit B1 and the current detection resistor R.

Connected to the positive electrode output terminal P1 of the full-wave rectifying circuit B1 through the booster winding 5a of the booster reactor L1 is a normally turned on type switch Q1n, such as the SIT, which is turned on and off in response to PWM control of the control circuit 11.

Further, connected to both terminals of the rush current limiting resistor R1 is the switch S1. This switch S1 includes a semiconductor switch, for instance such as a MOSFET and BJT (bipolar junction transistor) of a normally off type, which is controllably turned on by a short-circuiting signal delivered from the control circuit 11.

Connected to both ends of the rush current limiting resistor R1 is a startup power-supply section 12 that is comprised of a capacitor C6, a resistor R2 and a diode D5. The startup power-supply section 12 serves to extract a voltage, developed across the both terminals of the rush current limiting resistor R1, and output the terminal voltage of the capacitor C6 to the control circuit 11 for use as a reverse-biasing voltage to be applied to the gate of the switch Q1n. Further, the startup power-supply section 12 serves to supply a charged voltage of the smoothing capacitor C1 to the control circuit 11.

Upon turning on the alternating current power-supply Vac1, the control circuit 11 starts up in response to the voltage supplied from the capacitor C6 and outputs a reverse-biasing voltage, as a control signal, from the terminal b to the gate of the switch Q1n, thereby turning off the switch Q1n. This control signal includes a pulse signal with, for instance, −15V and 0V such that the switch Q1n is turned off with the voltage of −15V and turned on with the voltage of 0V.

Upon completion of a charging cycle of the smoothing capacitor C1, the control circuit 11 outputs the pulse signal with 0V and −15V, as the control signal, from the terminal b to the gate of the switch Q1n, for permitting the switch Q1n to perform switching operation. The control circuit 11 allows the switch Q1n to perform the switching operation and, subsequently, after an elapse of a given time interval, outputs a short-circuiting signal to the gate of the switch Q1n for turning on the same.

Further, an auxiliary winding provided in the booster reactor L1 has one end, connected to one end of the switch Q1n, one end of a capacitor C7 and the control circuit 11, and the other end connected to a cathode of a diode D7 whose anode is connected to the other end of the capacitor C7 and the terminal c of the control circuit 11. The auxiliary winding 5d, the diode D7 and the capacitor C7 form a normally operated power-supply section 13, by which a voltage, developed across the auxiliary winding 5d, is supplied to the control circuit 11 via the diode D7 and the capacitor C7.

Moreover, the control circuit 11 also has a function as the control circuit 10 of the second embodiment. Here, for the sake of avoiding the drawing figure from being complicated, the error amplifier 11, the multiplier 112, the error amplifier 113, the OSC 114 and the PWM comparator 116, which form the control circuit 10, are omitted.

Now, operation of the power factor correction circuit of the sixth embodiment with such a structure is described below with reference to FIGS. 33 to 35.

Figure 35:
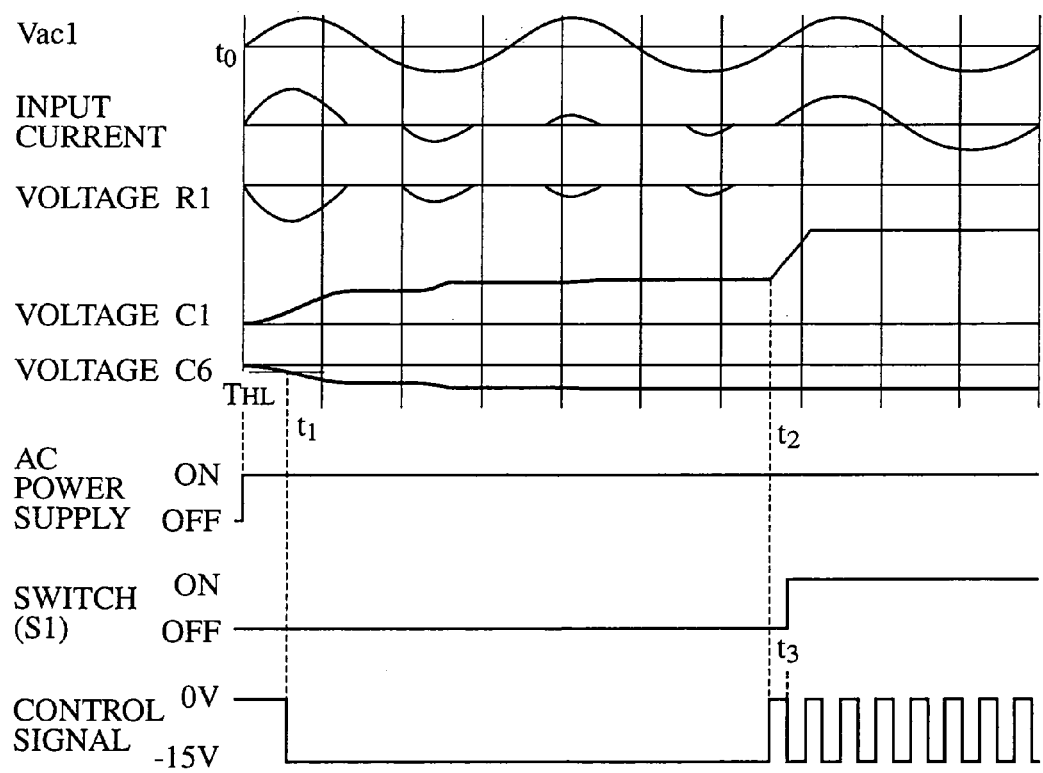
FIG. 35 is a timing chart for signals of various parts of the power factor correction circuit of the sixth embodiment.

Also, in FIG. 35, the reference "Vac1" designates the alternating current power-supply voltage of the alternating current power-supply Vac1; the term "input current" refers to a current flowing through the alternating current power-supply Vac1; the term "voltage R1" refers to a voltage developed across the rush current limiting resistor R1; the term "voltage C1" refers to a voltage of the smoothing capacitor C1; the term "voltage C6" refers to a voltage of the capacitor C6; and the term "control signal" refers to a signal applied from the terminal b of the control circuit 11 to the gate of the switch Q1n.

First, when the alternating current power-supply Vac1 is turned on at time t0, the alternating current power-supply voltage of tile alternating current power-supply Vac1 is full-wave rectified with the full-wave rectifying circuit B1. When this takes place, the switch Q1n, which is of the normally turned on type, remains in a turned-on state and the switch S1 remains in a turned-off state. Therefore, the voltage from the full-wave rectifying circuit B1 is applied to the rush current limiting resistor R1 via the smoothing capacitor C1 (in a path expressed as ① in FIG. 34).

Figure 34:
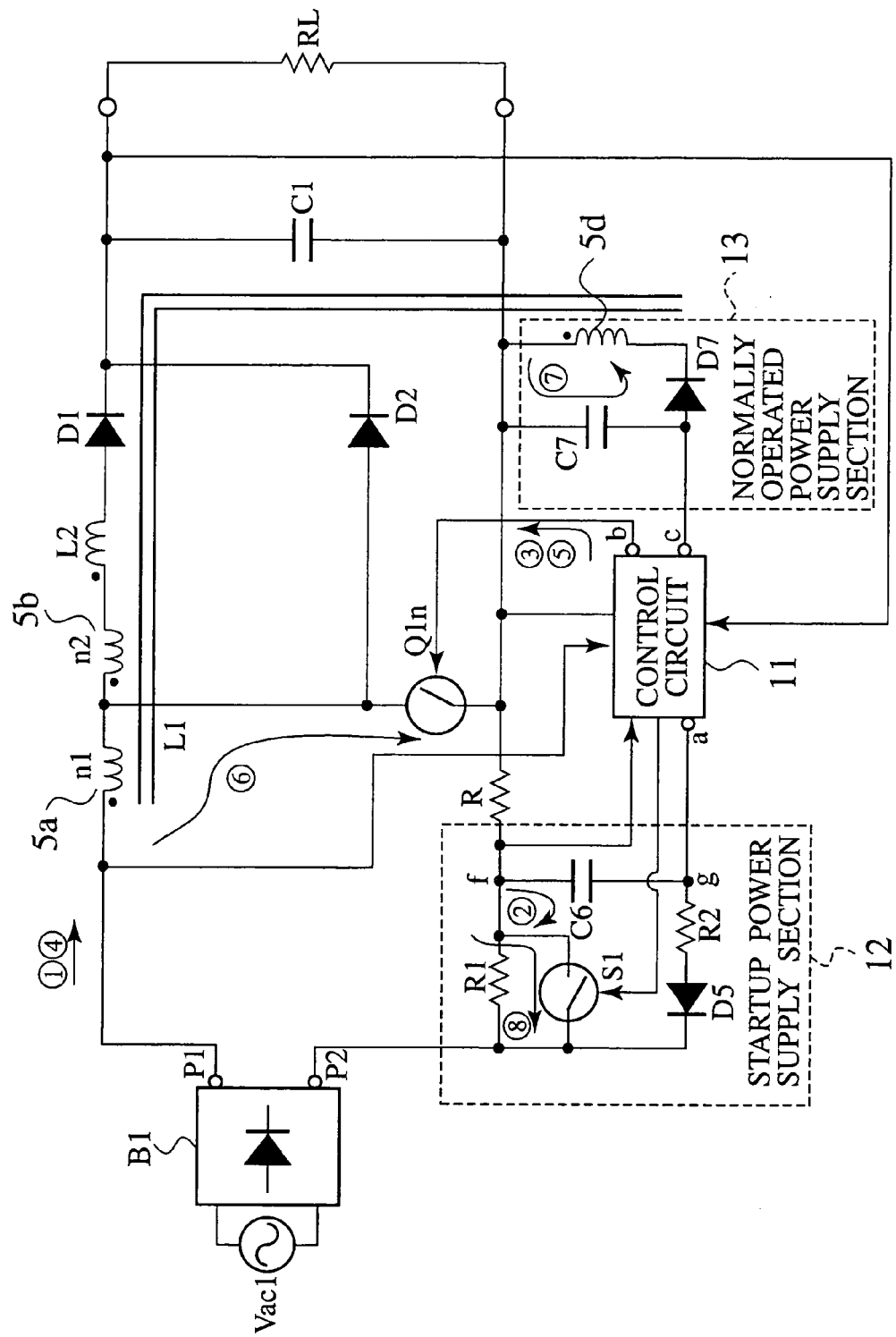
FIG. 34 is a view illustrating a basic sequence of operations of the power factor correction circuit of the sixth embodiment.

The voltage, developed across the full-wave rectifying circuit B1, is stored in the capacitor C6 via the diode D5 and the resistor R2 (in a path expressed as ② in FIG. 34). Here, the terminal f of the capacitor C6 lies, for instance, at zero potential and the terminal g of the capacitor C6 lies, for instance, at a negative potential. Therefore, the voltage of the capacitor C6 lies at a negative voltage (reverse-biasing voltage) as shown in FIG. 34. A negative voltage of the capacitor C6 is supplied to the control circuit 11 via the terminal a.

At time (time t1 in FIG. 35) at which the voltage across the capacitor C6 reaches a threshold voltage THL of the switch Q1n, the control circuit 11 outputs the control signal with −15V from the terminal b to the gate of the switch Q1n (in a path expressed as ③ in FIG. 34). Therefore, the switch Q1n is turned off.

Then, due to the voltage from the full-wave rectifying circuit B1, the smoothing capacitor C1 is charged (in a path expressed as ④ in FIG. 34) and the voltage of the smoothing capacitor C1 increases, thereby completing the charging cycle of the smoothing capacitor C1.

Consecutively, at time t2, the control circuit 11 commences the switching operation.

Initially, the control signal with 0V is outputted from the terminal b to the gate of the switch Q1n (in a path expressed as ⑤ in FIG. 34). Therefore, the switch Q1n is turned on and, hence, a current flows from the positive electrode output terminal P1 of the full-wave rectifying circuit B1 to the switch Q1n via the booster winding 5a of the booster reactor L1 (in a path expressed as ⑥ in FIG. 34), thereby permitting the booster reactor L1 to store energy.

Further, a voltage is developed across the auxiliary winding 5d, which is magnetically coupled with the booster reactor L1, and the resulting voltage is supplied to the control circuit 11 via the diode D7 and the capacitor C7 (in a path expressed as ⑦ in FIG. 34). As a consequence, the control circuit 11 is enabled to continuously operate, thereby enabling the switch Q1n to continuously perform the switching operation.

Subsequently, at time t3, the control signal with −15V is outputted from the terminal b to the gate of the switch Q1n. Therefore, the switch Q1n is turned off at time t3 and, hence, a current D2i flows to the smoothing capacitor C1 via the diode D2 to supply electric power to the load RL. Also, due to energy stored in the ZCS reactor L2, a current D1i flows to the smoothing capacitor C1 via the diode D1, thereby supplying electric power to the load RL.

Furthermore, when a short-circuiting signal is outputted from the control circuit 11 to the switch S1, the switch S1 is turned on (in a path expressed as ⑧ in FIG. 34), thereby causing the both terminals of the rush current limiting resistor R1 to be short-circuited. Thus, it becomes possible to reduce losses of the rush current limiting resistor R1.

Also, time t3 is determined as an elapsed time from a moment, at which the alternating current power-supply Vac1 is turned on (at time t0), and set to a time of a value approximately five times that of time constant ($\tau = C1 \cdot R1$) resulting from the smoothing capacitor C1 and the rush current limiting resistor R1. Subsequently, the switch Q1n repeatedly executes the switching operations to be turned on or turned off. After the switch Q1n has begun the switching operations, the switch S1 operates in a manner similar to the operation of the switch Q1 of the power factor correction circuit of the first embodiment shown in FIG. 3, that is, the operation in accordance with the timing chart shown in FIGS. 5 to 7.

Thus, the power factor correction circuit of the sixth embodiment has the same advantageous effects as those of the second embodiment and, in addition, has another advantage in that the control circuit 11 is arranged to begin the switching operations in which the switch Q1n is turned off in response to the voltage developed across the rush current limiting resistor R1 when the alternating current power-supply Vac1 is turned on, whereupon after the smoothing capacitor C1 has been charged, the switch Q1n is turned on or turned off, for thereby addressing the issues associated with the turned-on state of the power-supply. Accordingly, the semiconductor switch of the normally turned on type can be used, resulting in a capability of providing a power factor correction circuit with less occurrence of losses, that is, high efficiency.

Further, while the sixth embodiment has been described in conjunction with an example where the structure of the second embodiment is added with the normally turned on circuit as shown in FIG. 33, the normally turned on circuit, shown in FIG. 33, may be added to the structure of the first embodiment and the normally turned on circuit, shown in FIG. 33, may be added to the structures of the third embodiment, the fourth embodiment or the fifth embodiment.

Figure 36:
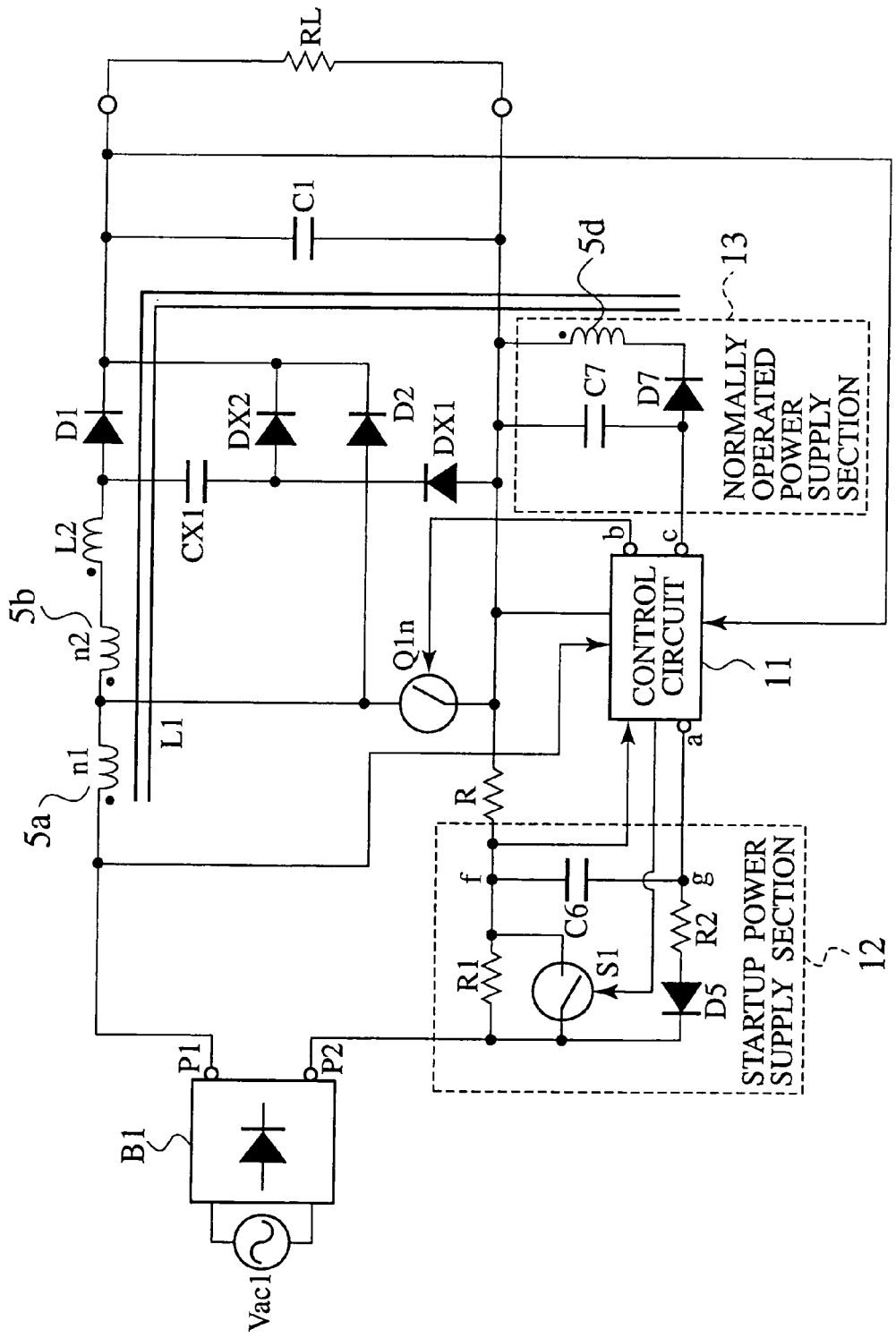
FIG. 36 is a circuit structural view illustrating the other example of the power factor correction circuit of the sixth embodiment.

FIG. 36 is a circuit structural view illustrating a power factor correction circuit of a modified form of the sixth embodiment. The power factor correction circuit of the modified form features to include, in addition to the structure of the power factor correction circuit of the sixth embodiment, the capacitor CX1, the diode DX1 and the diode DX2 to allow reduction in losses (e.g., spike current, as a result of recovery of the diode D1, and spike noises) resulting from diode recovery.

Also, the other structure is identical to the structure of the power factor correction circuit of the sixth embodiment shown in FIG. 33 and the same component parts bear same reference numerals to omit description of the same.

Now, operation of the power factor correction circuit of the modified form of the sixth embodiment is described.

As the switch Q1n is turned on, due to the recovery of the diode D1, a current flows in a path expressed as C1→D1→L2→5b→Q1n→C1 and this current flow is interrupted upon completion of the recovery cycle of the diode D1. In this moment, a voltage is developed across the ZCS reactor L2 in a direction to allow the diode D1 to be reverse-biased. Due to this voltage, a current flows in a path expressed as L2→5b→Q1n→DX1→CX1→L2, permitting electric charge to be stored in the capacitor CX1. When the switch Q1n is turned off, a current flows in a path expressed as Vac1→B1→L1→L2→CX1→DX2→C1→R→B1→Vac1, permitting this electric charge to be circulated to the load RL.

Thus, the power factor correction circuit of the modified form of the sixth embodiment has, in addition to the advantageous effects of the power factor correction circuit of the sixth embodiment, a capability of achieving further reduction in losses caused by the recovery cycle of the diode.

INDUSTRIAL APPLICABILITY

As set forth above, according to the present invention, a switch executes ZCS operation when turned on, achieving reduction in switching losses with resultant improvement in efficiency. Further, the switch executes ZCS operation when turned on and ZVS operation when turned off, achieving further reduction in switching losses with improved efficiency. Also, switching noises can be reduced with resultant miniaturization of a filter, while enabling to provide a power factor correction circuit of a booster type configured in a miniaturized structure with low noises and high efficiency.

The invention claimed is:

1. A power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off while converting the power-supply voltage into a direct current output voltage, comprising:

a first series circuit connected between one output terminal and the other output terminal of the rectifying circuit and including a booster winding and a wind-up winding, both wound on the booster reactor, a zero-current switching reactor, a first diode and a smoothing capacitor;

a second series circuit connected between one output terminal and the other output terminal of the rectifying circuit and including the booster winding of the booster reactor, and the main switch;

a second diode connected between a junction, between the booster winding and the wind-up winding of the booster reactor, and the main switch and the smoothing capacitor;

control means for controllably turning on and off the main switch to control an output voltage of the smoothing capacitor to a given voltage;

a third series circuit including a first capacitor, and a third diode connected between a junction, between the zero-current switching reactor and the first diode, and the smoothing capacitor; and a fourth diode connected between a junction, between the first capacitor and the third diode, and the smoothing capacitor.

2. A power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off while converting the power-supply voltage into a direct current output voltage, comprising:

a first series circuit connected between one output terminal and the other output terminal of the rectifying circuit and including a booster winding and a wind-up winding, both wound on the booster reactor, a zero-current switching reactor, a first diode and a smoothing capacitor;

a second series circuit connected between one output terminal and the other output terminal of the rectifying circuit and including the booster winding of the booster reactor, and the main switch;

a second diode connected between a junction, between the booster winding and the wind-up winding of the booster reactor, and the main switch and the smoothing capacitor;

control means for controllably turning on and off the main switch to control an output voltage of the smoothing capacitor to a given voltage;

a third series circuit connected to the main switch in parallel and including a third diode and a snubber capacitor;

a fourth series circuit connected between a junction, between the third diode and the snubber capacitor, and one terminal of the first diode and including a fourth diode, a regenerative winding wound on the booster reactor, a current limiting reactor and a regenerative capacitor; and a fifth diode connected between a junction, between the regenerative capacitor and the current limiting reactor, and a junction between the other terminal of the first diode and the smoothing capacitor, wherein the zero-current switching reactor and the current limiting reactor include a leakage inductor between windings of the booster reactor, and wherein the booster reactor includes the wind-up winding and the regenerative winding that are wound on a core in a nondense-coupled condition with respect to the booster winding.

3. A power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off while converting the power-supply voltage into a direct current output voltage, comprising:

a first series circuit connected between one output terminal and the other output terminal of the rectifying circuit and including a booster winding and a wind-up winding, both wound on the booster reactor, a zero-current switching reactor, a first diode and a smoothing capacitor;

a second series circuit connected between one output terminal and the other output terminal of the rectifying circuit and including the booster winding of the booster reactor, and the main switch;

a second diode connected between a junction, between the booster winding and the wind-up winding of the booster reactor, and the main switch and the smoothing capacitor;

control means for controllably turning on and off the main switch to control an output voltage of the smoothing capacitor to a given voltage;

a third series circuit connected to the main switch in parallel and including a third diode and a snubber capacitor;

a fourth series circuit connected between a junction, between the third diode and the snubber capacitor, and one terminal of the first diode and including a fourth diode, a regenerative winding wound on the booster reactor, a current limiting reactor and a regenerative capacitor; and a fifth diode connected between a junction, between the regenerative capacitor and the current limiting reactor, and a junction between the other terminal of the first diode and the smoothing capacitor, wherein the booster reactor includes a core having first to third legs, in which a magnetic circuit is formed, and wherein the first leg is wound with the booster winding, the second leg is wound with the wind-up winding and the third leg is wound with the regenerative winding.

4. A power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off while converting the power-supply voltage into a direct current output voltage, comprising:

a first series circuit connected between one output terminal and the other output terminal of the rectifying circuit and including a booster winding and a wind-up winding, both wound on the booster reactor, a zero-current switching reactor, a first diode and a smoothing capacitor;

a second series circuit connected between one output terminal and the other output terminal of the rectifying circuit and including the booster winding of the booster reactor, and the main switch;

a second diode connected between a junction, between the booster winding and the wind-up winding of the booster reactor, and the main switch and the smoothing capacitor;

control means for controllably turning on and off the main switch to control an output voltage of the smoothing capacitor to a given voltage, and for controlling a switching frequency of the main switch in dependence on a value of an alternating current power-supply voltage of the alternating current power-supply, wherein the control means includes:

first error voltage generating means for amplifying an error between the output voltage and a reference voltage to generate a first error voltage signal;

multiplied output voltage generation means for multiplying the first error voltage signal of the first error voltage generating means and the rectified voltage of the rectifying circuit to generate a multiplied output voltage;

current detection means for detecting an input current flowing through the rectifying circuit;

second error voltage generation means for amplifying an error between a voltage depending on the input current, detected by the current detection means, and the multiplied output voltage of the multiplied output voltage generation means;

frequency control means for generating a frequency control signal, by which a switching frequency of the main switch is varied, depending on a value of the alternating current power-supply voltage of the alternating current power-supply; and pulse width control means for controlling a pulse width depending on the second error voltage signal of the second error voltage generation means and generating a pulse signal, by which the switching frequency of the main switch is varied, in dependence on the frequency control signal generated by the frequency control means, to allow the pulse signal to be applied to the main switch for controlling the output voltage to the given voltage.

5. A power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off while converting the power-supply voltage into a direct current output voltage, comprising:

a first series circuit connected between one output terminal and the other output terminal of the rectifying circuit and including a booster winding and a wind-up winding, both wound on the booster reactor, a zero-current switching reactor, a first diode and a smoothing capacitor;

a second series circuit connected between one output terminal and the other output terminal of the rectifying circuit and including the booster winding of the booster reactor, and the main switch;

a second diode connected between a junction, between the booster winding and the wind-up winding of the booster reactor, and the main switch and the smoothing capacitor; and control means for controllably turning on and off the main switch to control an output voltage of the smoothing capacitor to a given voltage, and for controlling a switching frequency of the main switch in dependence on a value of an alternating current power-supply voltage of the alternating current power-supply, wherein the control means is operative to set to switching frequency to a lower limit frequency when the alternating current power-supply voltage is less than a lower limit preset voltage and set the switching frequency to an upper limit frequency when the alternating current power-supply voltage exceeds an upper limit preset voltage while varying the switching frequency from the lower limit frequency to the upper limit frequency under circumstances where the alternating current power-supply voltage remains in a range between the lower limit preset voltage and the upper limit preset voltage.

6. The power factor correction circuit according to claim 5, wherein the control means is operative to interrupt switching operations of the main switch under circumstances where the alternating current power-supply voltage is less than the lower limit preset voltage.

7. A power factor correction circuit for correcting an input power factor by allowing a rectified voltage, obtained by rectifying an alternating current power-supply voltage of an alternating current power-supply with a rectifying circuit, to be inputted to a main switch via a booster reactor and allowing the main switch to be turned on or turned off while converting the power-supply voltage into a direct current output voltage, comprising:

a first series circuit connected between one output terminal and the other output terminal of the rectifying circuit and including a booster winding and a wind-up winding, both wound on the booster reactor, a zero-current switching reactor, a first diode and a smoothing capacitor;

a second series circuit connected between one output terminal and the other output terminal of the rectifying circuit and including the booster winding of the booster reactor, and the main switch;

a second diode connected between a junction, between the booster winding and the wind-up winding of the booster reactor, and the main switch and the smoothing capacitor;

a rush current limiting resistor connected between the rectifying circuit and the smoothing capacitor and decreasing a rush current of the smoothing capacitor when the alternating current power-supply is turned on;

a semiconductor switch connected to the rush current limiting resistor in parallel; and control means for controllably turning on and off the main switch to control an output voltage of the smoothing capacitor to a given voltage, wherein the main switch includes a normally turned on type switch, and wherein the control means is operative to:

turn the main switch off in response to a voltage developed across the rush current limiting resistor when the alternating current power-supply is turned on;

begin switching operations to turn on and off the main switch after the smoothing capacitor is charged; and turn on the semiconductor switch after the switching operations of the main switch are commenced.

* * * * *